United States Patent [19]
Volk

[11] 3,950,082
[45] Apr. 13, 1976

[54] OPHTHALMIC LENS FOR PRESBYOPIA AND APHAKIA

[76] Inventor: David Volk, 2460 Fairmount Blvd., Cleveland, Ohio 44106

[22] Filed: Jan. 15, 1975

[21] Appl. No.: 541,147

Related U.S. Application Data

[63] Continuation-in-part of Ser. No. 322,488, Jan. 10, 1973, abandoned.

[52] U.S. Cl. ............... 351/169; 351/167; 351/161; 351/177
[51] Int. Cl.² ......................................... G02C 7/06
[58] Field of Search ............ 351/169, 167, 161, 177

[56] References Cited
UNITED STATES PATENTS

3,687,528    8/1972    Maitenaz ........................... 351/169

*Primary Examiner*—David H. Rubin
*Attorney, Agent, or Firm*—Baldwin, Egan, Walling & Fetzer

[57] ABSTRACT

There is presented a multifocal ophthalmic lens of homogeneous transparent optical material useful for the correction of the refractive error and the accommodative insufficiency or absence of accommodation in presbyopia and in aphakia, the lens characterized by having a unique variable front surface, and a coacting conicoid surface of eccentricity zero or greater, or toric, back surface, said variable front surface characterized by being geometrically and optically regular and continuous and having a pair of intersecting orthogonal principal planes, the first of said planes, generally horizontal, intersecting said variable surface normally at all points in a circular or elliptical or substantially elliptical great arc, the derivative of curvature vanishing at said great arc in sections orthogonal to it; the second of said planes, generally vertical, intersecting said variable surface normally at all points in a principal curve, about which there is symmetry, at least the portion of said principal curve below said great arc increasing in curvature progressively, said orthogonal principal planes intersecting along the axis of said variable surface, said axis intersecting said variable surface normally at an axial umbilical point where the derivative of curvature vanishes, all transverse sections of said surface at least below said great arc by planes orthogonal to said principal curve being conics of eccentricity greater than zero, or slight modifications thereof, the axes of all of said conics intersecting normally said principal curve, and the apical curvatures of said conic transverse sections at said principal curve being substantially equal to and increasing at an accelerated rate substantially equal to the corresponding curvature and rates of change respectively along said principal curve, while the corresponding eccentricities of said conic transverse sections also increase.

11 Claims, 23 Drawing Figures

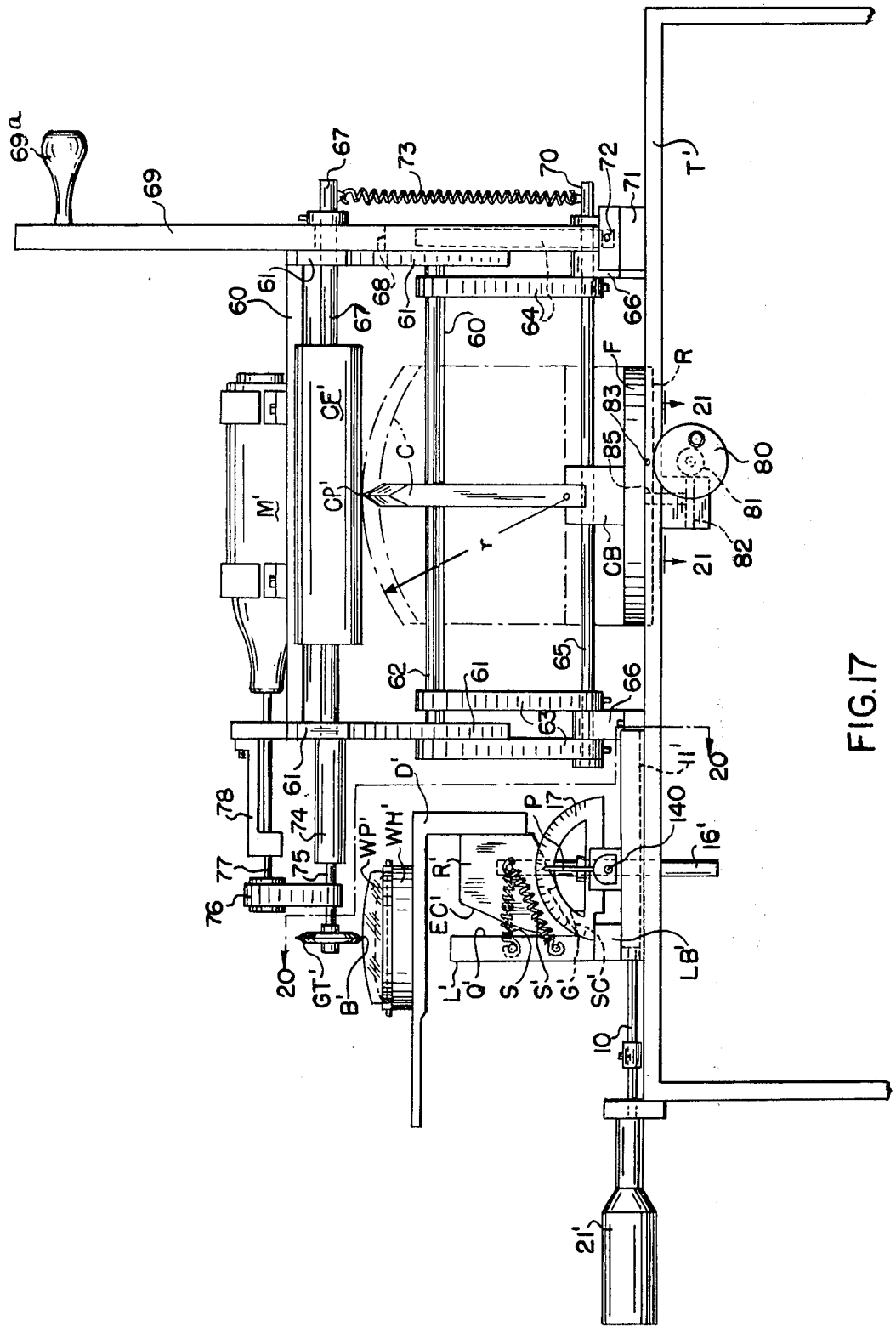

OPHTHALMIC LENS FOR PRESBYOPIA AND APHAKIA

This application is a continuation-in-part of my pending application Ser. No. 322,488, filed Jan. 10, 1973, now abandoned.

This invention relates to an improved ophthalmic lens, either of spectacle lens or contact lens type, primarily intended for the relief of the refractive error and the accommodative insufficiency or absence of accommodation in presbyopia and aphakia. Ordinarily the optical treatment of said insufficiency or absence of accommodation is accomplished with either simple reading glasses, or bifocals, or trifocals in spectacles, or with bifocals in corneal contact lenses. In the lens of this invention, the change in optical power of the ophthalmic lens required to supplement the failing or absence of accommodation in presbyopia and the lack of accommodation in aphakia is accomplished in a continuous and regular manner, without discontinuities in the field of vision through the lens, and with minimal distortion in the field. The design of the lens in its principal embodiment is such that, in gaze at distant objects through the upper portion of the lens as it is worn in spectacles, or worn as a corneal contact lens, vision is clear, and as objects are observed through lower and lower portions of the lens, they must be closer and closer to the wearer to be seen clearly. The continuous and regular increase in refractive power from the upper distance portion to the lower border results from the combination of a conicoid back surface of eccentricity zero or greater or a toric back surface, the toric being used when ocular astigmatism is to be corrected, and a unique front surface which increases in curvature continuously and regularly in an accelerated manner from said upper portion to provide the increasing refractive power for the correction of the accommodative insufficiency or absence of accommodation.

Throughout the remainder of this specification and in the clamis, I shall speak of conics as sections of the unique front surface of the lens of this invention. I intend including within the definition of said conics those slight modifications which are dependent upon and are a consequence of the shape of the edge of a circular cam follower and the shape of the edge of a circular abrading tool which are used in the method and apparatus of this invention to produce said unique front surface.

A conic can be described in terms of its focus, $f$, and eccentricity, $e$, that is, in terms of magnitude and shape. The eccentricity, $e$, of a conic is a constant and is given by the differential equation:

$$e = df/dx \qquad (1)$$

where $f$ is the focal radius of the conic and $x$ is the coordinate along the axis containing said focus with the apex of the conic as the origin. Should $df/dx$ vary with $x$, then a more appropriate mathematical description of the resulting modified conic in terms of eccentricity can take the form of a Taylor series which takes into account the rate of change of eccentricity. Using MacLaurin's formula:

$$e_g = df/dx + (d^2f/dx^2)x + \frac{(d^3f/dx^3)x^2}{2!} + \frac{(d^4f/dx^4)x^3}{3!} \qquad (2)$$

where $e_g$ given by equation (2) is defined as the generalized or effective eccentricity. When the derivatives of eccentricity are small, the modified conic can osculate a conic over a relatively large extent about their common apex. Hence, for the purpose of simplifying the description of this invention, both the osculating conic and the modified conic will be described as of the focus and eccentricity, or of the apical radius of curvature and eccentricity, of the osculating conic, it being understood that differences in the two curves manifest themselves when the curves are extended.

For the purpose of simplifying the description of this invention, the points of intersection of the major and minor axes of an ellipse with the ellipse will hereinafter be called the prolate and oblate points respectively.

Figure 3:
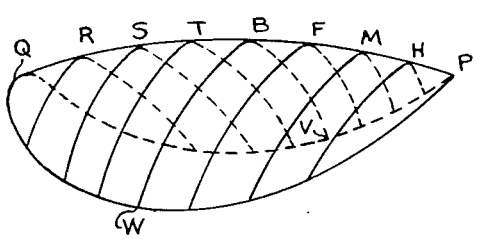
Figure 4:
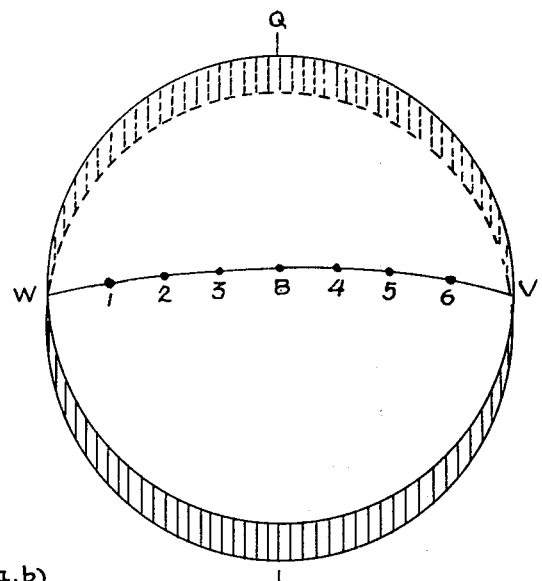
Figure 6:
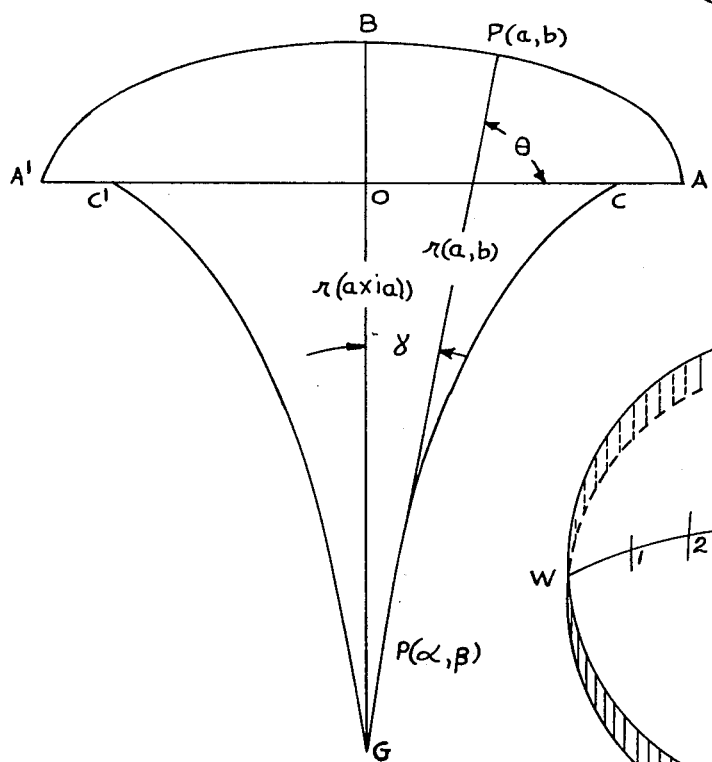
Figure 5:
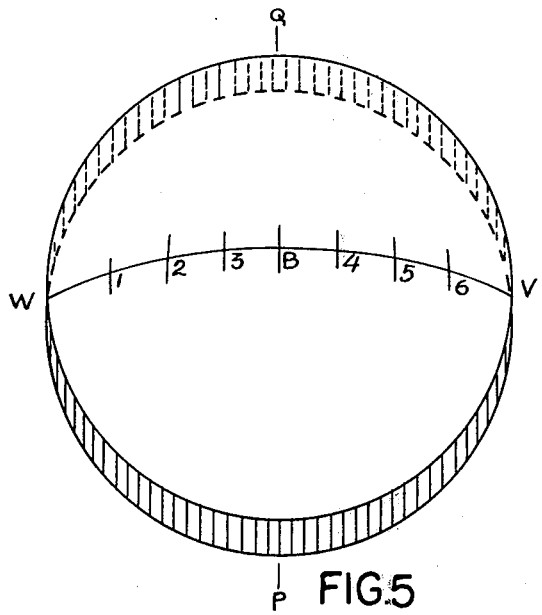
Figure 7:
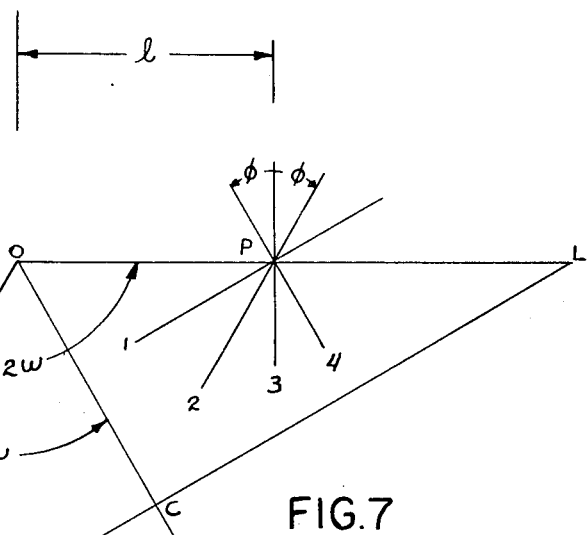
Figure 8:
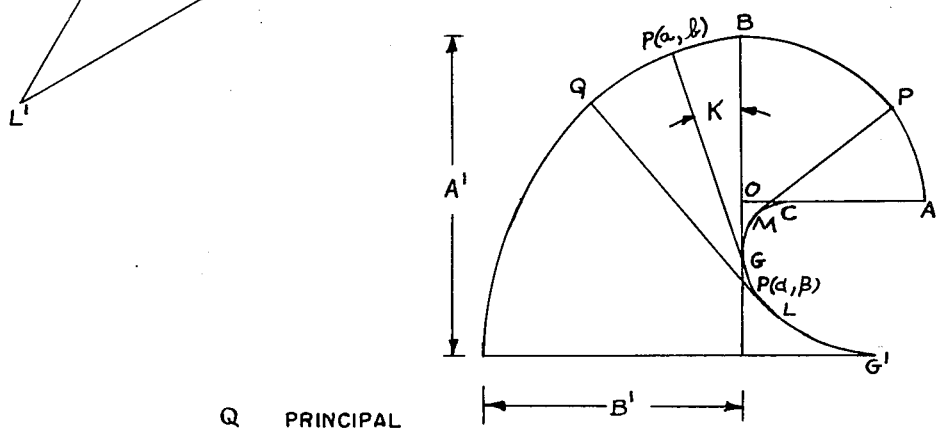
Figure 9:
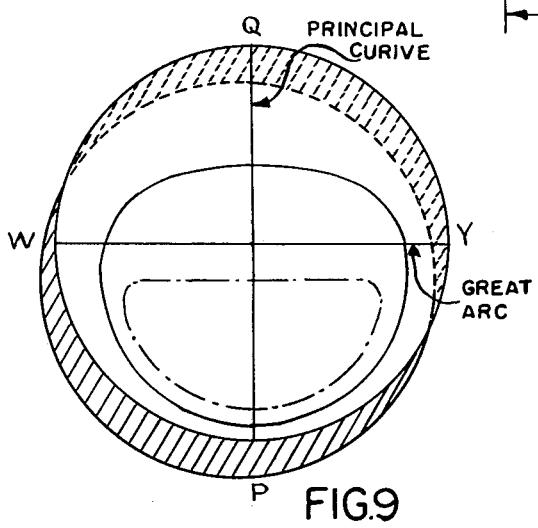
Figure 15:
Figure 16:
Figure 10:
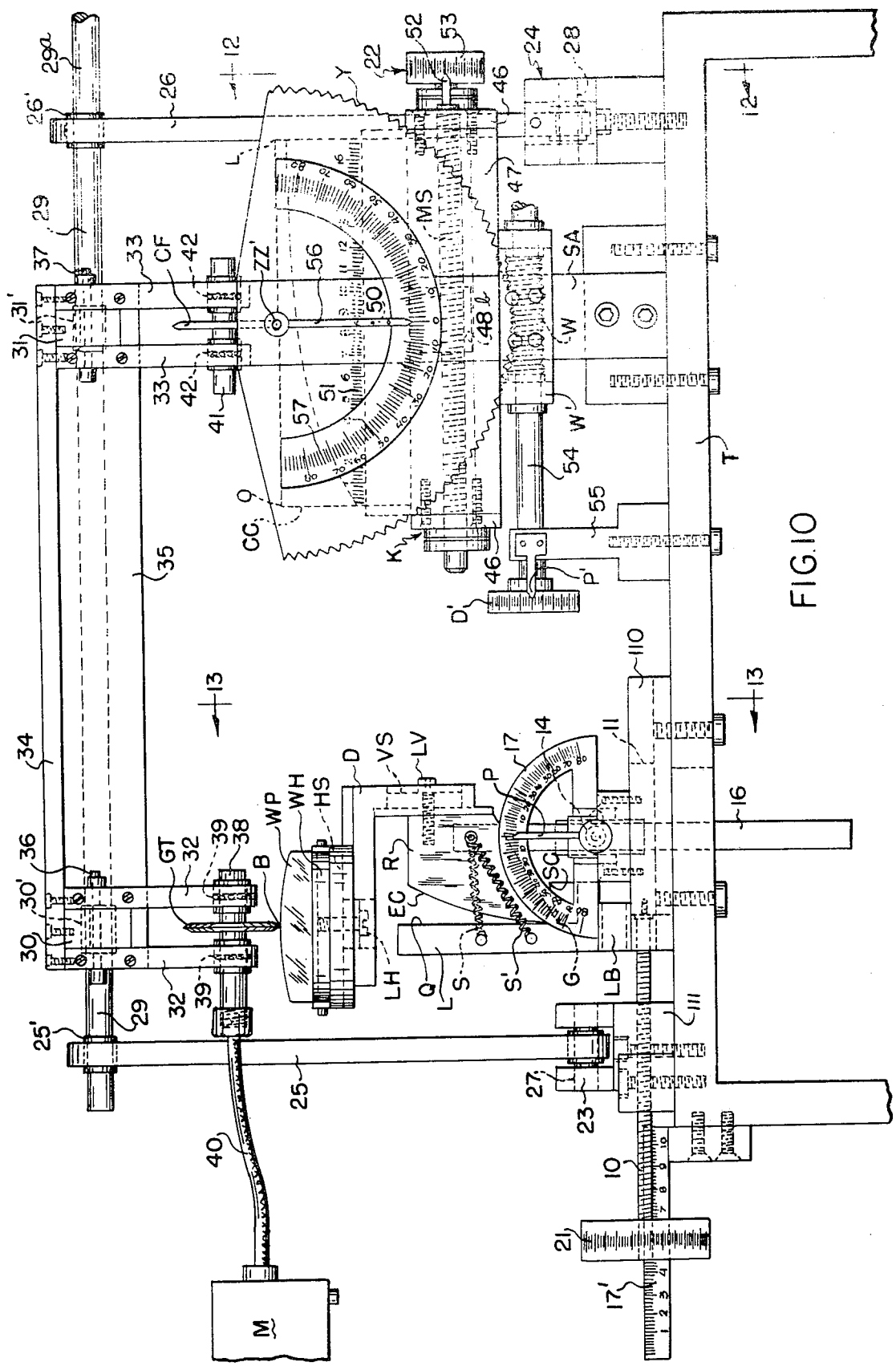
Figure 11:
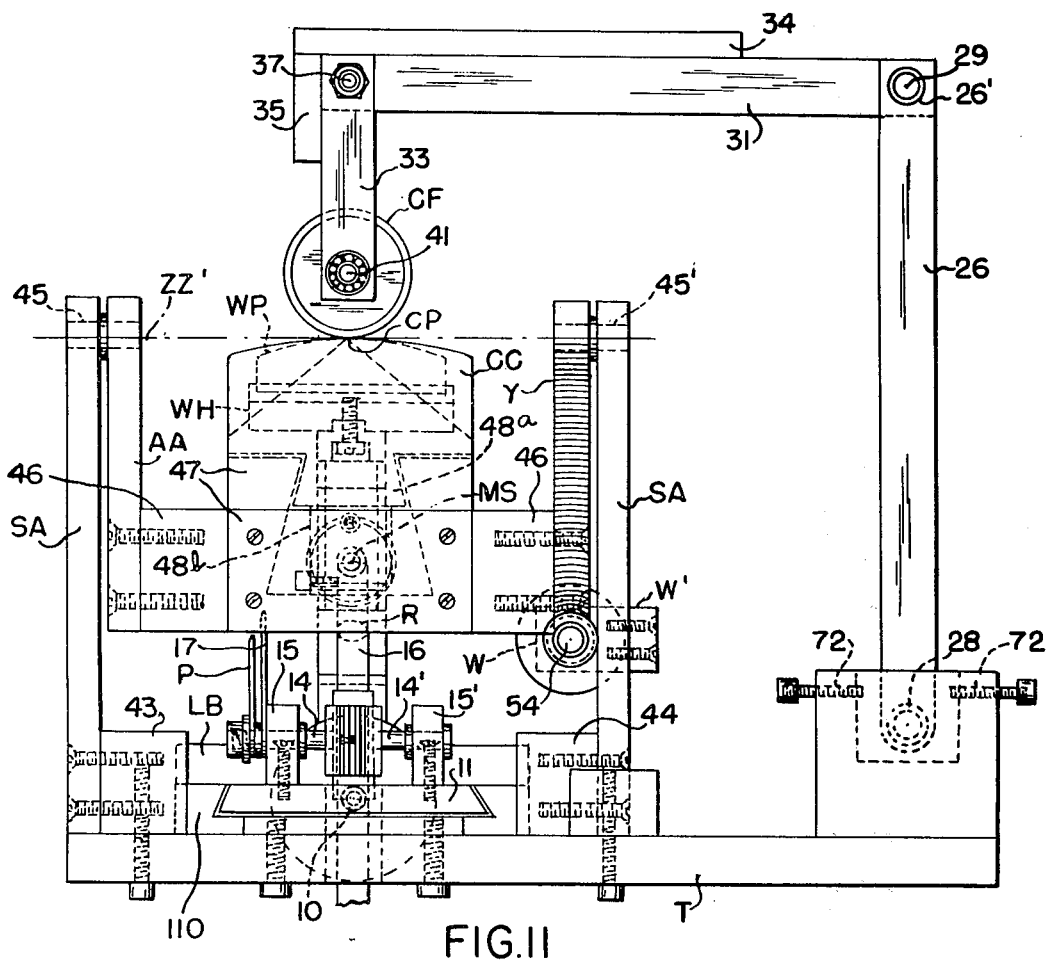
Figure 12:
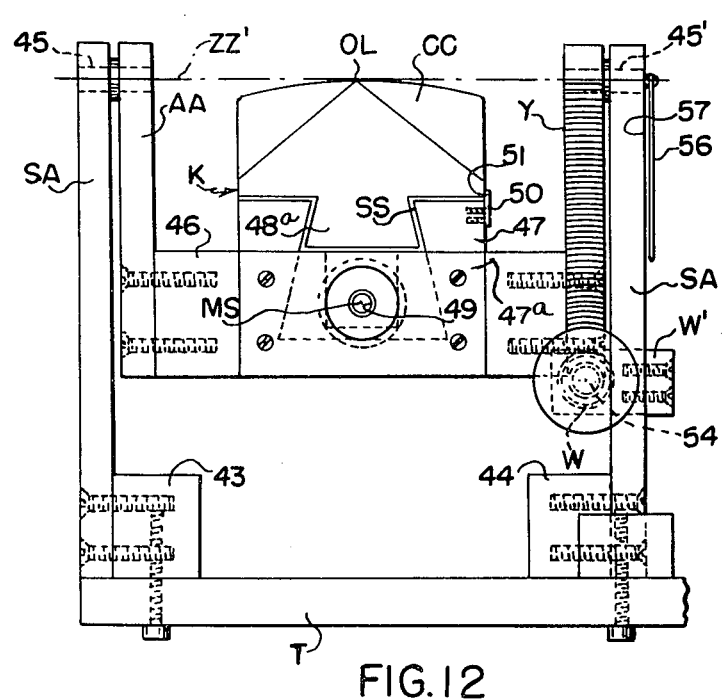
Figure 14:
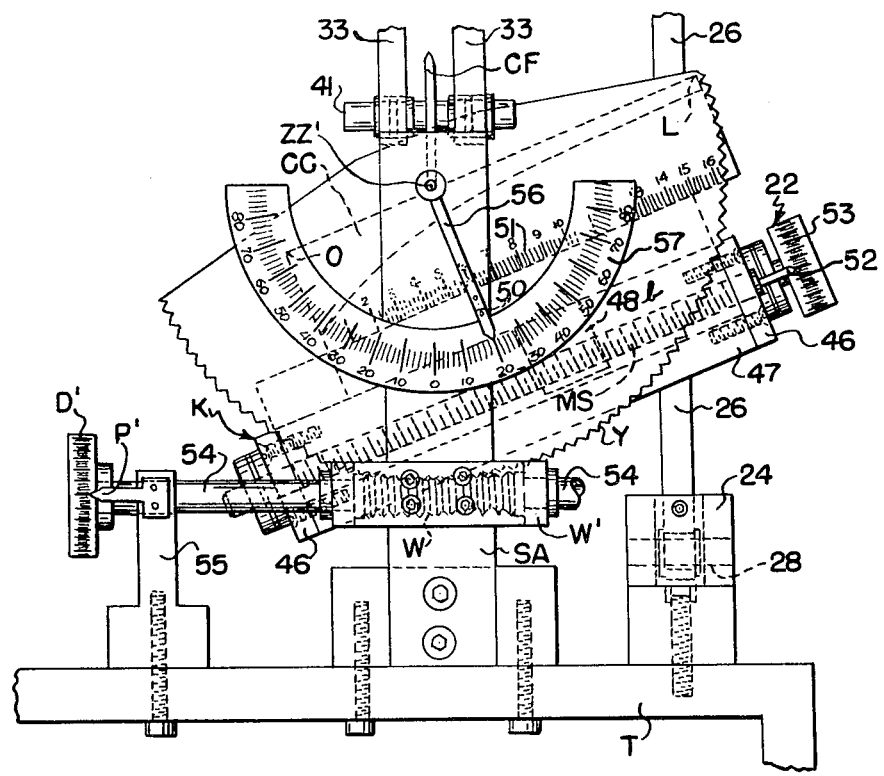
Figure 13:
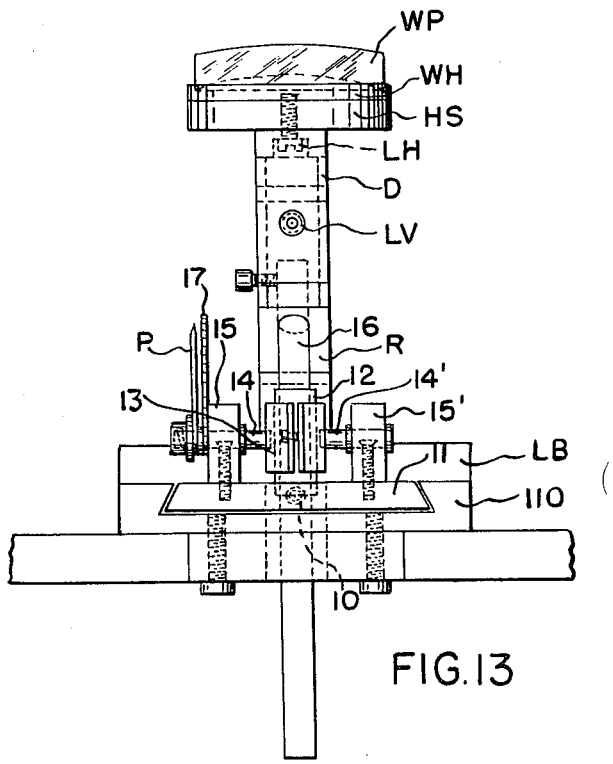
Figure 18:
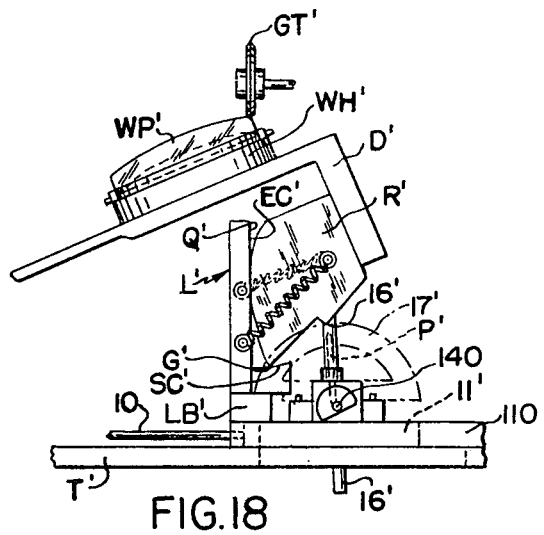
Figure 19:
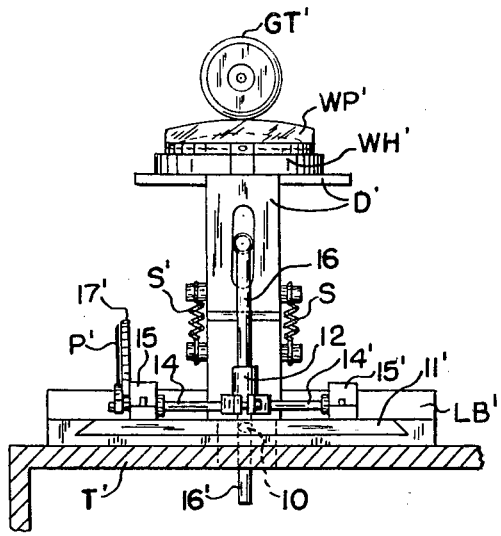
Figure 20:
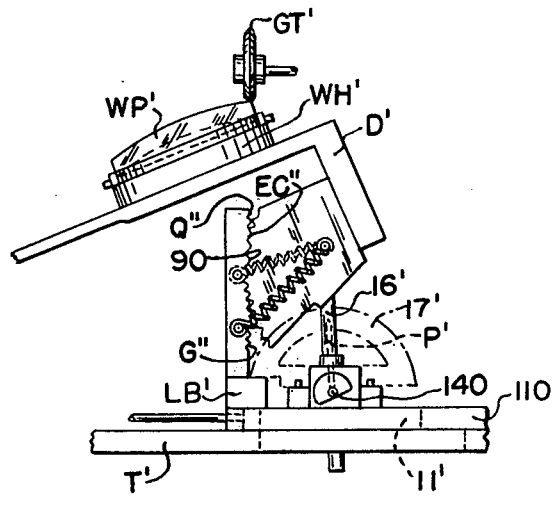
Figure 21:
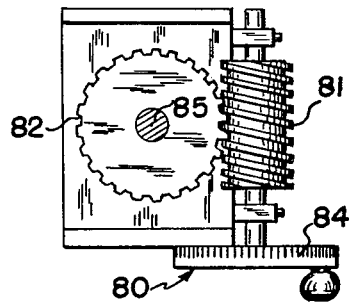
Figure 22:
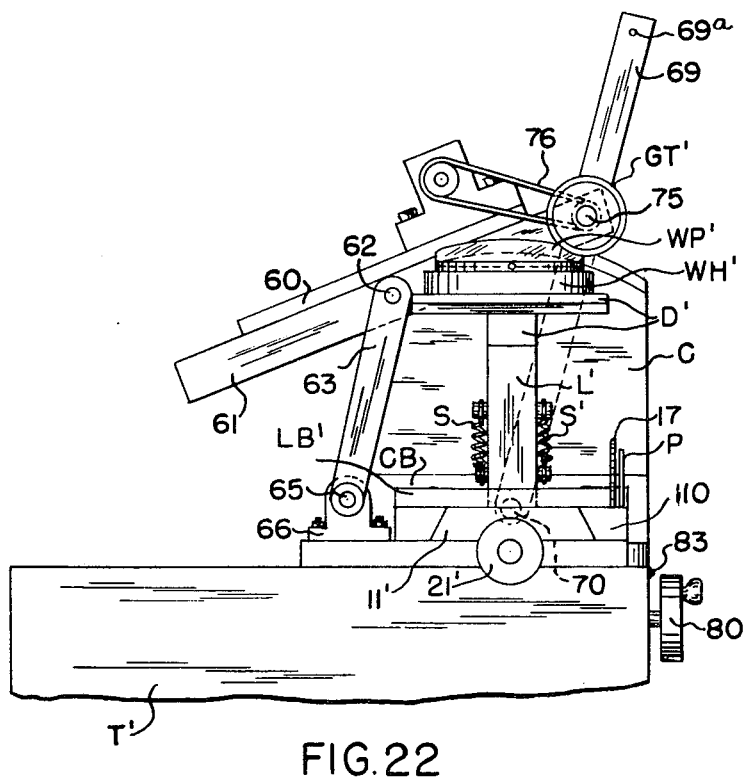

FIG. 3 is a diagrammatic view used to represent several embodiments of the variable surface WQVP of the lens of this invention. Arc QBP is the principal curve. Point B is the axial umbilical point. In one embodiment, point B is the oblate point of elliptical arc BP and the prolate points of elliptical arc QB and elliptical great arc WBV. In this embodiment, all transverse sections of the variable surface are conics of eccentricity greater than zero with their apices along the principal curve, selected apical points shown at R, S, T, B (the axial umbilical point), F, M and H. Transverse sections through F, M and H increase successively in curvature at their apices and in eccentricity, the curvatures at the apices of said transverse sections or transverse curvatures being substantially equal to the corresponding vertical curvatures at said points. In another embodiment, principal curve QBP is an elliptical arc with its oblate point at B, the axial umbilical point. Great arc WBV is circular. Transverse sections through F, M and H are conics which increase in curvature successively at apical points F, M and H, and in eccentricity, the transverse curvatures through said points being substantially equal to the corresponding vertical curvatures. The remainder of the variable surface is identical to that just described, the surface being symmetrical about great arc WBV. In another embodiment, the two portions of the variable surface on opposite sides of the great arc WBV are similar to that just described but not identical;

FIG. 4 is a diagrammatic view of one of the embodiments of the lens of this invention in which the variable surface WQVP has a circular great arc WBV which is umbilical along its entire extent and along which the derivative of curvature of said surface vanishes. At each of points 1, 2, 3, B, 4, 5 and 6 along said great arc, vertical and horizontal curvatures are equal and curvatures at all of said points are equal in magnitude;

FIG. 5 is a diagrammatic view of one of the embodiments of the lens of this invention in which the variable surface WQVP has an elliptical great arc WBV with its prolate point at axial point B at which the variable surface is umbilical and at which the derivative of curvature vanishes. At each of points 1, 2, 3, B, 4, 5 and 6 along said great arc, the derivative of curvature of a vertical section orthogonal to said great arc vanishes;

FIG. 6 shows an elliptical arc A'BA which provides a principal curve, major axis A'OA, semi-major axis OA, semi-minor axis OB and its extension OG. Arc GC is the evolute or locus of centers of curvature for elliptical arc segment BA. GB is the radius of curvature of the elliptical arc at point B as well as the radius of curvature of the great arc of this invention at right angles to A'BA at point B. GB is, therefore, normal to both the principal curve and the great arc at B, the previously mentioned axial umbilical point;

FIG. 7 shows a plane section containing the axis OC of a right circular cone L'OL, of cone angle L'OL = $2\omega$, in the plane of the drawing, and sections through the cone perpendicular to the plane of the drawing at a distance $l$ from the apex of the cone along element OL and various angles $\phi$ with respect to that section perpendicular to said element OL of said cone;

FIG. 8 shows a principal curve primarily intended for a cataract lens using this invention formed of two elliptical portions, an upper portion QB with its prolate point at B, the axial point, and a lower portion BP with its oblate point at B. Arc LGM is the combined evolute arc for said two portions of the principal curve; LG the evolute arc related to elliptical arc QB, and GM the evolute arc related to elliptical arc BP;

FIG. 9 is a diagram showing in full lines how an ordinary size spectacle lens may be cut out of the large lens formed according to this invention, and in dot-dash lines showing how a lens to fit a half-eye frame (well known in the art) can be formed substantially wholly below the great arc;

FIG. 10 is a side elevational view of lens forming apparatus associated with the first embodiment;

FIG. 11 is an end view of the same taken at the right-hand end of FIG. 10;

FIG. 12 is a partial end view taken along the line 12—12 of FIG. 10;

FIG. 13 is an end view taken from an intermediate position along the line 13—13 of FIG. 10;

FIG. 14 is a side elevational view of the right-hand portion of FIG. 10 showing another position of the parts;

FIG. 15 is an edge view, enlarged, of the cam follower and the abrading tool in the apparatus of FIG. 10, in which said tool has a sharp abrading edge in the form of a circle;

FIG. 16 is an edge view showing a modification of the cam follower and abrading tool of the apparatus of FIG. 10, in which the edge of the cam follower or tool is a circular arc in section, and the edge may be called toric;

FIG. 17 is a side elevational view of apparatus associated with the second embodiment of this invention;

FIG. 18 is a side elevational view of the work holder at the left end of FIG. 17 showing one position of the parts;

FIG. 19 is an end view taken on the line 19—19 of FIG. 17;

FIG. 20 is a view similar to FIG. 18 showing a modified arrangement for preventing slippage between the evolute cam and its coacting vertical plane;

FIG. 21 is a view, enlarged, taken along the line 21—21 of FIG. 17;

FIG. 22 is an end view taken at the left end of FIG. 17; while

Figure 23:
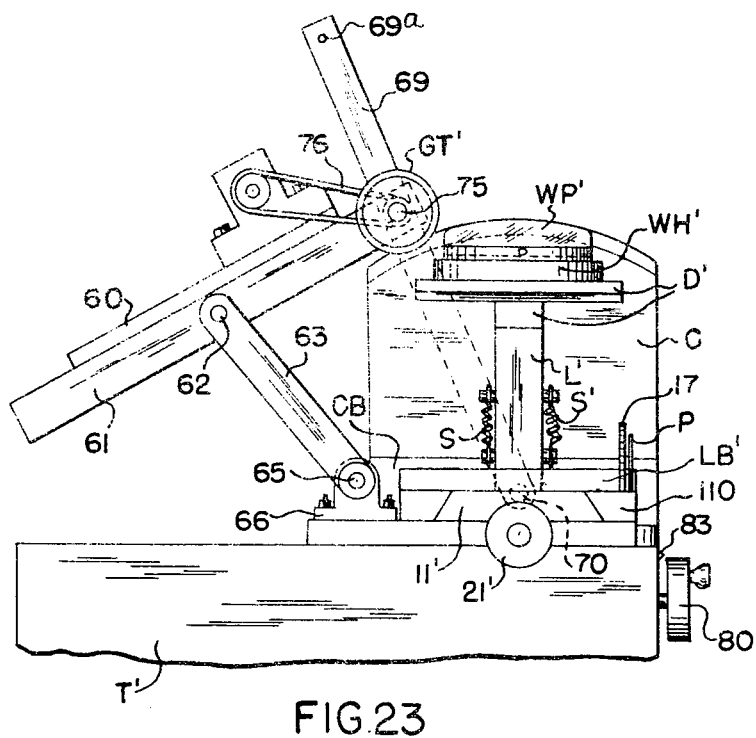

FIG. 23 is an end view taken at the left end of FIG. 17 showing a different position of the parts.

Several novel features of the lens of this invention, illustrated in FIGS. 1 through 5, differentiate it from existing ophthalmic lenses which change in power to correct presbyopia. These features are dependent upon the geometry of the unique front surface, hereinafter called the variable surface, at least a portion of which changes in optical power in a continuous and regular manner to provide the added refractive power necessary to correct the accommodative insufficiency or absence of accommodation in presbyopia and in aphakia. These novel features of the variable surface are:

1. A specific axis at the intersection of a pair of orthogonal principal planes each of which intersects the variable surface normally at all points, the two planes meeting on the surface at an umbilical point hereinafter called the axial point.

2. The first of said planes, generally horizontal, which is the horizontal principal plane, intersects said variable surface in a generally horizontal circular or elliptical arc, hereinafter called the great arc, with the prolate point of said arc, when elliptical, coinciding with the axial point, said horizontal principal plane being a real or potential plane of symmetry, as will be discussed later.

3. The second of said planes, generally vertical in direction, which is the vertical principal plane, is a plane of symmetry which intersects said variable surface in a curved line hereinafter called the principal curve, the portion of said principal curve below the axial point being elliptical with its oblate point at the axial point and increasing in curvature in an accelerated manner while the portion above said axial point is either circular, or elliptical with its prolate point at the axial point and identical to either half of the great arc, or is similar in shape to that portion below the great arc and with its oblate point at the axial point. When the portion above the great arc is the same shape as that below, the horizontal principal plane is a plane of symmetry.

4. At the axial point, the derivative of curvature of the variable surface vanishes.

5. Along the principal curve, from the axial point downward, the curvature of the variable surface increases continuously and regularly in an accelerated manner, and at all points along said portion of the principal curve, in directions orthogonal to it, the curvature of said surface also increases in a continuous and regular manner from the axial point downward at an accelerated rate substantially equal to that along the principal curve itself. From the great arc upward, the surface may be spherical, or a prolate ellipsoid or slight modification thereof, or similar to, or identical to that portion below the great arc, as will be described later.

6. Along the principal curve from the axial point downward, and from the axial point upward when the portion of the principal curve above the great arc is not circular, all plane sections of the surface orthogonal to the principal curve, hereinafter called transverse sections, are conics of eccentricity greater than zero (in the broad sense hereinabove referred to) whose axes containing both foci lying in the vertical principal plane intersect normally the principal curve. Below the great arc, the curvatures at the apices of consecutive conic transverse sections at the principal curve increase at an accelerated rate down the principal curve from said great arc at a rate equal to that along said portion of the principal curve while the corresponding eccentricities of said conics also increase. When the portion of the principal curve above the great arc is elliptical with its oblate point at the axial point, the curvature at the apices of consecutive conic transverse sections at the principal curve increase at an accelerated rate up the principal curve from said great arc at a rate substantially equal to that along said portion of the principal curve while the corresponding eccentricities of said conics also increase. When the portion of the principal curve above the great arc is elliptical with its prolate point at the axial point, the curvature at the apices of consecutive conic transverse sections at the principal curve decrease at an accelerated rate up the principal curve from said great arc at a rate less than that along said portion of the principal curve while the corresponding eccentricities of said conic transverse sections also decrease. When the portion of the principal curve above the great arc is circular, all transverse sections of the variable surface above the great arc are circular and identical.

7. The variable surface is unique in that in addition to having a generally vertical principal curve of varying curvature, at least in that portion of the principal curve below the axial point, it also has a great arc which is either a circular umbilical arc along which the derivative of curvature of the variable surface vanishes, see FIG. 4, and hence said variable surface along such great arc can be osculated by a matching sphere, or an elliptical arc along which the derivative of curvature at said arc of all sections orthogonal to it vanish, see FIG. 5, and hence said variable surface along such great arc can be osculated by a matching prolate ellipsoid of revolution. The fact that the derivative of curvature at said great arc, either circular or elliptical, of all sections orthogonal to it vanish, is fundamental and makes it possible for the variable surface to be composed of two distinct portions, a portion above and a portion below the great arc, and yet be perfectly continuous and regular across said great arc, without geometrical or optical discontinuity. Hence, the portion of the variable surface above the great arc can be a spherical surface or a prolate ellipsoid surface, each a surface of revolution, and yet each can be geometrically and optically continuous with the portion below the great arc which is not a surface of revolution. Hereinafter when I describe the portion of the variable surface below the great arc, it is to be understood that the same description may apply to the portion above the great arc which may be similar to or identical to the portion below.

Figure 2:
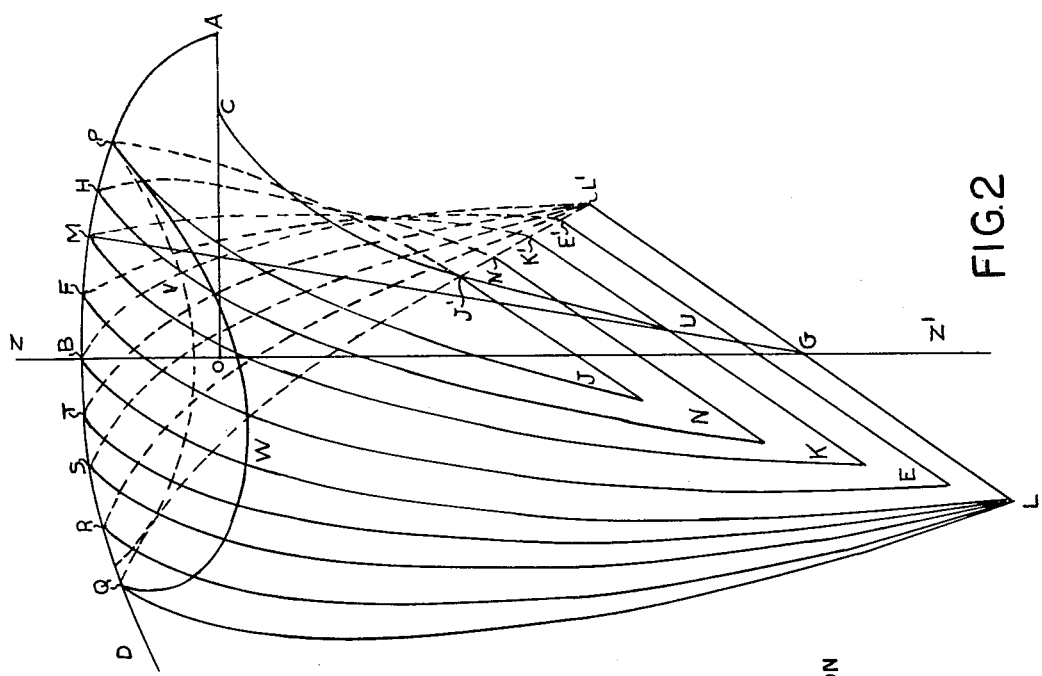
FIG. 2 is a diagrammatic and geometric view of the variable surface WQVP in the first embodiment of the lens of this invention showing the principal curve QBP and transverse sections of the variable surface as circular arcs above the circular great arc WBV at R, S and T, and as conics at F, M and H below the great arc.
Figure 1:
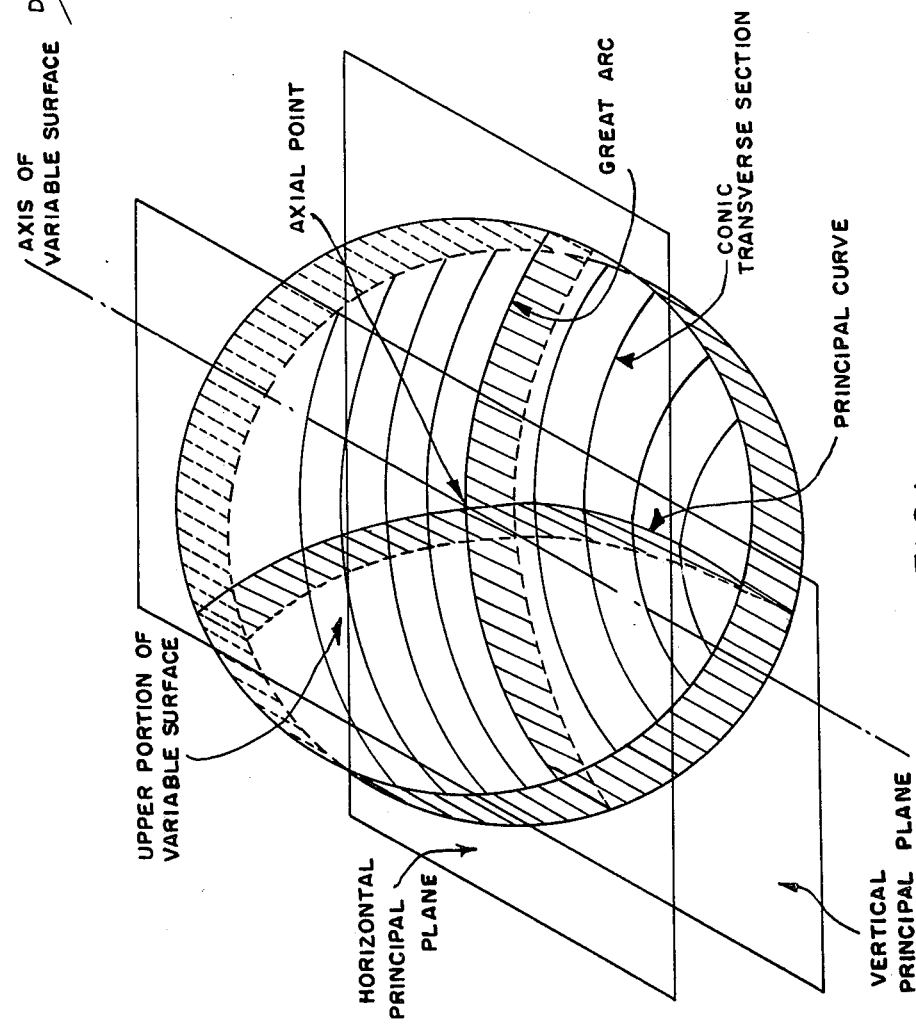
FIG. 1 is a diagrammatic view of the lens of this invention showing the horizontal and vertical principal planes cutting the variable surface of the lens in the great arc and principal curve respectively.

In FIG. 2, I have shown the geometry of one embodiment of the unique variable surface of the lens of this invention as outlined in the seven previous points. Arc QBP is the principal curve; QB is circular and BP is elliptical with OB being the sem-minor axis and OA the semi-major axis of the ellipse providing elliptical arc BP. Arc WBV is the great arc. The vertical principal plane contains the principal curve and the axis of the surface ZZ'. The horizontal principal plane contains the great arc and axis ZZ'. Point B is the axial point on the variable surface outlined by the circle WQVP. Arcs LBL', LTL', LSL' and LRL' are circular, all of radius length GB, and each of said arcs across the variable surface represents a circular transverse section. Line LGL' represents a diameter of the sphere contributing the spherical portion of the variable surface WQVP. Arcs EFE', KMK' and NHN' are conics, each of said conics representing a transverse section across the variable surface and each of said conic transverse sections, in the order given, being greater in apical curvature and in eccentricity than the preceding transverse section, and the apical curvature of each transverse section being substantially equal to the corresponding vertical curvature along the principal curve, with both said transverse and vertical curvatures increasing at an accelerated rate along elliptical arc BP. Arc GC is the evolute of elliptical arc BA as well as the locus of centers of curvature of the apices of the corresponding conic transverse sections. As an example of the centers of curvature at a point along the principal curve, consider point M. A normal from point M is tangent to evolute GC at point U, the center of both vertical and transverse curvatures at point M.

FIG. 3 is used to illustrate various embodiments of the lens of this invention in which the upper portion of the variable surface differs in each of the embodiments being either spherical; or a prolate ellipsoid; or identical to; or similar to; the lower portion, and yet retaining the essential features characteristic of the lens of this invention, namely, a lens having a variable surface with orthogonal principal planes which intersect said variable surface normally at all points in a great arc and a principal curve, axis, axial umbilical point at which the derivative of curvature vanishes, geometrical and optical continuity across said great arc, and a continuous and regular increase in refractive power from the great arc down said variable surface wherein the transverse curvatures and substantially equal to the corresponding vertical curvatures along said principal curve.

The lens of this invention is made of transparent homogeneous optical material, either glass or plastic, with glass preferred for spectacle lenses. When finished as an ophthalmic spectacle lens, it will have the usual appearance of an ophthalmic lens, i.e., it will be shaped to conform to a spectacle frame and will be of usual thickness. When finished as a corneal contact lens of ophthalmic plastic it will have the usual appearance of a corneal contact lens, approximately the size of the cornea or slightly smaller, ballasted (thickened) at the bottom of the lens to maintain the principal curve substantially vertical. Hereinafter, the description of this invention will be with reference to ophthalmic spectacle lenses, it being understood that corneal contact lenses embodying the principles taught in this invention are included as part of this invention.

The variable surface is preferably the front convex surface of the lens, although optically equivalent properties may be obtained when the principles of this invention are incorporated in an appropriately curved variable surface which is posterior and concave.

Ophthalmic spectacle lenses are generally supplied by lens manufacturers to prescription shops in two forms: First, as an excessively large and thick lens having one of its surfaces finished to required specifications. This lens is then modified by generating and polishing the opposite surface so as to incorporate a patient's prescription and reduce lens thickness to a desired amount, and further modified by edging the lens to the desired shape; and second, as a lens optically finished on both surfaces and of desired thickness. This lens is then edged to the desired shape by the prescription shop. The first form is called a semi-finished lens while the second form is called a finished uncut lens. In this specification, only the semi-finished form of the lens of this invention will be described in detail, it being understood that semi-finished ophthalmic lenses are further processed by prescription shops to a finished lens of ordinary thickness. The finished uncut lens produced by the manufacturer is the same as a semi-finished lens which has been generated, ground and polished by a prescription shop, but not edged to shape.

In a manner analogous to that for conventional bifocals and trifocals, for the non-aphakia patient, for the purpose of minimizing aberrations, the most widely used embodiment of the lens of this invention is designated as +2.25, +4.25, +6.25, +8.25 and +10.25 base curves, the designation of a base curve being the nominal power of the variable surface at its axial point. For each base curve, there are a series of adds, the add being the difference in dioptric powers of the variable surface between that at the axial point and that at a predetermined distance down the principal curve, 25 mm below the axial point for example.

The same rules of coflexure for minimizing aberrations which apply to spherical lenses and toric lenses, well known in the art as corrected curve lenses, can also apply to the lens of this invention in the horizontal principal plane along the great arc. For lens powers from about −20.00 diopters to about +7.50 diopters through said axial point, the great arc can be circular, and the lens of this invention with said circular great arc can be considered equivalent to a corrected curve spherical or toric lens through said great arc. Hereinafter I will speak of such lenses as the "corrected curve lenses of this invention". For lens powers above +7.50 diopters through said axial point, the great arc can be elliptical with the prolate point of said elliptical great arc at the axial point, and said lens of this invention can be considered, along said great arc, equivalent to a strong plus aspheric ophthalmic lens designed to correct oblique power error and oblique astigmatic error, such strong plus lenses being designed and used primarily for the correction of aphakia, the coflexure of said strong lenses being designated as that at its axis, or axial coflexure. It should be understood, however, that the lens of this invention, for powers below +7.50 diopters, need not follow the conventional base curve specifications and conventional coflexure in the horizontal principal plane, but may be made with an elliptical great arc so that the correction of oblique power error and oblique astigmatic error along said great arc, is a function of the changing curvature along said great arc as well as the axial coflexure.

In order to achieve the variable surface of the lens of this invention, it is essential that the derivative of curvature of the principal curve vanish at the axial point and that at said axial point the upper and lower portions of the principal curve be tangential and of equal curvature. With these criteria the principal curve, at least below the axial point, can be an elliptical arc with its oblate point at the axial point, or a cycloid with its apex at the axial point, or slight modifications of said curves or other similar curves, or generally stated, an involute arc in which at its origin at the axial point, the derivative of curvature vanishes. Since the derivative of curvature of a circle is zero, a circular arc whose curvature is that of the variable surface at its axis may be used as the upper portion of the principal curve which is continuous at said axial point with said lower portion which is either an elliptical arc, a cycloid, or modifications of such curves as described above, the portion of the variable surface above the great arc being spherical. The derivative of curvature of the elliptical arc at its prolate point also vanishes so that the principal curve can be formed of a lower portion elliptical arc joined at its oblate point to another elliptical arc at its prolate point as the upper portion, and such a principal curve can be used in the variable surface of the lens of this invention for the cataract range of lenses. Other principal curves can be designed which meet the criteria stated above.

The elliptical arc may serve as all or part, or parts, of the principal curve of the variable surface of the lens of this invention and it will be used as an example to illustrate how a principal curve of the variable surface can be constructed, it being understood that this is by way of illustration only and it is not intended to limit this invention to principal curves of elliptical arcs only.

The first example will be that in which an upper portion circular arc is joined to a lower portion elliptical arc at its oblate point, both portions of said curve having the same radius of curvature at their junction which is at the axial point of the variable surface. Such a principal curve is used in a corrected curve lens of this invention having a variable surface with an upper spherical portion and in which the great arc is circular, coflexure being used to correct aberrations through said upper portion. The second example will be that in which an elliptical arc as the upper half of said principal curve is joined at its prolate point to a second elliptical arc at its oblate point and serving as the lower half of said principal curve, said prolate and said oblate points being of equal curvature at the axial point. Such a principal curve is used in the variable surface having an upper portion which is an ellipsoid of revolution and in which the great arc is elliptical, the appropriate ellipsoid of revolution portion in combination with a given spherical or toric posterior surface being used to correct aberrations through said upper portion.

First consider an elliptical arc to be used as the lower portion of the principal curve. By suitable choice of an ellipse whose arc is utilized as said lower part, the radius of curvature at said axial point and the radius of curvature at a given point along said elliptical arc can be made equal to predetermined values.

In FIG. 6, I have drawn elliptical arc A'BA with A'O and AO the semi-major axes of the ellipse and with OB the semi-minor axis about which arc A'BA is symmetrical. Point B is the axial point referred to previously. Point O is the center of the ellipse. OG is an extension of semi-minor axis OB. Arc C'G is that branch of the evolute of the ellipse corresponding to elliptical arc segment A'B, and GC is that branch of the evolute corresponding to elliptical arc segment BA.

Since the two halves of FIG. 6 are symmetrical about BOG, only the right half will be considered in the following discussion. Using Cartesian coordinates with the point O as origin, where $a$ is the coordinate of the ellipse in the direction of the semi-major axis, OA, of length A, the abscissa, and $b$ is the coordinate of the ellipse in the direction of the semi-minor axis, OB, of length B, the ordinate, the radius of curvature, $r(a,b)$, for any point $P(a,b)$, along arc segment BA is given by the equation:

$$r(a,b) = \frac{(A^4 b^2 + B^4 a^2)^{3/2}}{A^4 B^4} \qquad (3)$$

By setting $a$ equal to zero, equation (3) becomes:

$$r(\text{axial}) = A^2/B \qquad (4)$$

Let $r$(axial) be a predetermined radius of curvature at said axial point, for example the radius of curvature of one of the base curve values previously mentioned. The value $r(a,b)$ can represent a predetermined radius of curvature for a predetermined value $a$ such that the dioptric power at point $P(a,b)$ for the optical material used, is greater than the dioptric power at the axial point by a desired amount, 1.25 diopters for example, (where dioptric power is given by the well known equation, $D = (n-1)/r$, $n$ being the index of refraction of the optical material).

The value of $b$ is determined by the following equation:

$$b = B(1 - a^2/A^2)^{1/2} \qquad (5)$$

An ellipse can be completely defined by two appropriate numbers, the lengths of the semi-major and the semi-minor axes, for example, or the length of the focus, $f$, and the eccentricity, $e$. Given the radii of curvature of two specific points on the ellipse, one of said points being at the minor axis and the other at a known distance from the minor axis, and using equations (3), (4) and (5), the ellipse may be readily defined.

Rewriting equation (4) as:

$$A^2 = r(\text{axial})B \qquad (6)$$

and using the value for $b$ from equation (5) and the value of $A^2$ from equation (6), equation (3) can be simplied and rewritten as:

$$r(a,b) = \frac{[(r(\text{axial})^2 + a^2)B^4 - r(\text{axial})a^2B^3]^{3/2}}{r(\text{axial})^2B^6} \qquad (7)$$

Since $r(a,b)$, $r$(axial) and $a$ are predetermined values, the value $B$ (the only unknown in equation (7) can be solved for. Rewriting equation (7) in the following form to solve for B:

$$B = \frac{-r(\text{axial})a^2}{[r(a,b)^2 r(\text{axial})^4]^{1/3} - r(\text{axial})^2 - a^2} \qquad (8)$$

the value of B obtained with equation (8) is then used in equation (4) to obtain the value of A. Hence A and B are known and the ellipse is defined. To express the ellipse in terms of the parameters $e$ and $f$, the following equations are used:

$$e = (1 - B^2/A^2)^{1/2} \qquad (9)$$

and $$f = (1 - e)A \qquad (10)$$

As a specific example of an elliptical arc appropriate for the lower portion of the principal curve of the variable surface of the corrected curve lens of this invention (the first example), let the dioptric power at the axial point be +4.15 diopters (4.25 diopter base curve), and let the desired vertical power at $a = 0.0250$ meters be +5.40 diopters. Let the refractive material be crown glass of $n = 1.5230$. Then $r$(axial) $= 0.126024$ meters and $r(a,b) = 0.0968519$ meters.

Applying these values to equation (8), the value of B determined is $B = 0.0247550$ meters and by means of equation (4), $A = 0.0558545$ meters. By means of equations (9) and (10), $e = 0.896420$ and $f = 0.00578540$ meters. Thus the portion of the principal curve below the axial point in the form of an elliptical arc is determined. Hereinafter when I refer to the specific example, it will be the ellliptical arc hereinabove determined which will be considered.

using equation (5) and the pair of values A and B previously determined for the specific example, values of $b$ are computed for a series of values of $a$ ranging from 0.0000 to 0.0350 meters, $a$ increasing in steps of 0.0001 meters, or less if desired. The sets of values A, B, $a$ and $b$ are then utilized in the following equation to determine the dioptric power $D(a,b)$(vertical) for the series of points $P(a,b)$ along the principal curve:

$$D(a,b) \text{ (vertical)} = \frac{(n-1)A^4B^4}{(A^4b^2 + B^4a^2)^{3/2}} \qquad (11)$$

with $A$, $B$, $a$, and $b$ expressed in meters.

The rate of change in dioptric power, $D'(a,b)$(vertical), with respect to distance $s$ along the principal curve, or $dD(a,b)/ds$,
is given by the following equation:

$$D'(a,b) \text{ (vertical)} = \frac{dD(a,b)}{ds} = \frac{3(n-1)(A^2 - B^2)(AB)^6 ab}{(A^4b^2 + B^4a^2)^3} \qquad (12)$$

To obtain D′ in diopters/cm, the value obtained by equation (12) must be multiplied by $10^{-2}$.

Note that if either $a$ or $b$ in equation (12) goes to zero, the derivative of curvature vanishes. Hence with either (or both) a prolate point or an oblate point at the axial umbilical point, the derivative of curvature of said surface at said point vanishes.

I have described the vertical and transverse powers along the lower portion of the principal curve as being substantially equal. I intend including within the definition of substantially equal not only the condition of exact equality of said vertical and transverse powers, but those small predetermined systematic differences which can be useful for the correction of oblique astigmatic error for vision through the lens of this invention along said lower portion of the principal curve. The expression relating $D(a,b)$(transverse) and $D(a,b)$(vertical) which includes said systematic differences is:

$$D(a,b)(\text{transverse}) = D(a,b)(\text{vertical}) \pm \Delta D'(a,b)\text{-} \\ \text{(vertical)} \qquad (13)$$

where $\Delta$ is a value between 0.0 and 0.2 and $D'(a,b)$-(vertical) is the magnitude in diopters taken from the value D′ expressed as diopters/cm.

The radius of curvature, $r(a,b)$(transverse), of each of said transverse sections along said principal curve determined by equation (13) is:

$$r(a,b) \text{ (transverse)} = \frac{n-1}{D(a,b) \text{ (transverse)}} \qquad (14)$$

In order to simplify the description of this invention, the examples used in this specification will be that in which $D(a,b)$(transverse) and $D(a,b)$(vertical) are equal along said lower portion of the principal curve and the variable surface has no astigmatism along said portion of the principal curve.

If the transverse sections were circular, there would be an increasing astigmatism lateral to said lower portion of the principal curve, hereinafter called lateral astigmatism. The amount of said lateral astigmatism, V, in diopters, for any point on the variable surface at a distance $h$, in centimeters, lateral to the principal curve would equal $h$ times twice the rate of change in refractive power in diopters per centimeter along the principal curve at the level of said point. Expressed as an equation:

$$V = 2hD'(a,b) = 2h \frac{dD}{ds}(a,b) = \frac{6(n-1)(A^2-B^2)(AB)^6 hab}{100(A^4b^2+B^4a^2)^{3/2}} \quad (15)$$

The principal directions of said lateral astigmatism would be approximately at 45° and 135° and said astigmatism would cause an increasing blurring and distortion for vision through increasingly lateral and lower portions of said lens below the level of the great arc.

A novel and important feature of the lens of this invention which reduces distortion and lateral astigmatism to considerably less than that predicted by equation (15) resides in the unique design of the variable surface of the lens in which the transverse sections are conics which increase progressively in eccentricity from the great arc downward. At increasingly lower portions of the variable surface where the rate of increase in refractive power along the principal curve is high, the eccentricity of the conic transverse sections is also large. The rate of curvature decreases from the apex of a conic laterally, increases with the eccentricity of the conic, hence in the lower portion of the variable surface where the rate of curvature increase down the principal curve is large, the decrease in curvature along the transverse sections is also large. The effect of said conic transverse sections as compared to that of circular transverse sections is a reduction in the downward and laterally increasing curvature of the variable surface on both sides of the principal curve with the result that both lateral astigmatism and distortion are relatively small in magnitude.

In Table I, I have listed for the specific example some of the values of $a$, ranging from 0.0000 to 0.0350, and the corresponding values of $D(a,b)$(vertical), $D'(a,b)$-(vertical, $D(a,b)$(transverse), $r(a,b)$(vertical and $r(a,b)$(transverse).

Table 1

| a Meters | D(vert) Diopters | D'(vert) Diopt.cm | D(trans) Diopters | r(vert) Meters | r(trans) Meters |
|---|---|---|---|---|---|
| 0.0000 | 4.1500 | 0.0000 | 4.1500 | 0.126024 | 0.126024 |
| 0.0050 | 4.1904 | 0.1628 | 4.1904 | 0.124809 | 0.124809 |
| 0.0100 | 4.3157 | 0.3412 | 4.3157 | 0.121186 | 0.121186 |
| 0.0150 | 4.5388 | 0.5542 | 4.5388 | 0.115229 | 0.115229 |
| 0.0200 | 4.8852 | 0.8298 | 4.8852 | 0.107058 | 0.107058 |
| 0.0250 | 5.4000 | 1.2138 | 5.4000 | 0.096852 | 0.096852 |
| 0.0300 | 6.1638 | 1.7902 | 6.1638 | 0.084850 | 0.084850 |
| 0.0350 | 7.3285 | 2.7277 | 7.3285 | 0.071365 | 0.071365 |

Through each point $P(a,b)$ along said elliptical portion of the principal curve below the axial point, a normal to said curve intersects the major axis of the ellipse of said elliptical portion at a distance $ae^2$ from the center O of said ellipse and continues to the point of tangency on the evolute of said elliptical portion of the principal curve at the point $P(\alpha,\beta)$ which is the center of curvature of the infinitesimal length of arc about point $P(a,b)$. The slope $\theta$ of said normal with respect to said major axis is:

$$\theta = \tan^{-1} \frac{b}{a(1-e^2)} \quad (16)$$

The coordinates of $P(\alpha,\beta)$ are:

$$\alpha = a - r(a,b) \cos \theta, \text{ and} \quad (17)$$
$$\beta = b - r(a,b) \sin \theta \quad (18)$$

Hence, for every point $P(a,b)$ along said elliptical portion of the principal curve, there is a corresponding angle $\theta$ and a corresponding point $P(\alpha, \beta)$ on said evolute. See FIG. 6.

It should be noted that the distance $GP(\alpha,\beta)$ along the evolute plus the distance $r(a,b)$ which is the same as the distance $P(\alpha,\beta) P(a,b)$, is a constant equal in magnitude to GB, the radius of curvature $r$(axial). Therefore, if the evolute GC of FIG. 6 were rotated counterclockwise and rolled along a fixed vertical line GB without slipping, then all points $P(a,b)$ of said elliptical portion of the principal curve would pass through point B, with said principal curve always being perpendicular to fixed vertical line GB. It is this fact which provides the basis for obtaining the desired conic portion of the principal curve of the variable surface of the lens of this invention.

Using equations (16), (17) and (18) and the values of $a$, $b$, and $e$ previously determined for the specific example, a sequence of values of $\theta$, $\alpha$ and $\beta$ are calculated for each value of $a$ ranging from 0.0000 to 0.0350 in steps of 0.0001 meters. The series of coordinates, $\alpha$ and $\beta$, are used in the machining of a rolling evolute cam, hereinafter called the evolute cam, for the apparatus of this invention.

In Table 2, I have listed for the specific example some of the values of $a$, $\alpha$, $\beta$, $\theta$ and $\gamma$, where $\gamma=(90-\theta)$. For each value of $a$ there is a specific rotation $\gamma$ of the evolute cam which is necessary for the production of said desired elliptical portion of the principal curve of the variable surface below said axial point.

Table 2

| a Meters | α Meters | β Meters | θ Degrees | γ=(90−θ) Degrees |
|---|---|---|---|---|
| 0.0000 | 0.000000 | −0.101269 | 90.0000 | 0.0000 |
| 0.0050 | 0.0000322 | −0.100055 | 87.7188 | 2.2812 |
| 0.0100 | 0.000258 | −0.096439 | 85.3889 | 4.6111 |
| 0.0150 | 0.000869 | −0.090513 | 82.9560 | 7.0440 |
| 0.0200 | 0.002061 | −0.082431 | 80.3536 | 9.6464 |
| 0.0250 | 0.004025 | −0.072416 | 77.4922 | 12.5078 |
| 0.0300 | 0.006955 | −0.060779 | 74.2403 | 15.7597 |
| 0.0350 | 0.011044 | −0.047932 | 70.3855 | 19.6145 |

If a right circular cone is sectioned by a plane, the sections obtained are termed conic sections or conics. There are two classes of conics, those of eccentricity less than 1.0, the closed conics or ellipses, and those of eccentricity greater than 1.0, the open conics or hyperbolas. Separating these two classes of conics is the parabola, of eccentricity 1.0, obtained when the sectioning plane is parallel to one of the straight line elements of the surface of the cone. If the sectioning plane is perpendicular to the axis of the cone, the ellipse obtained of eccentricity 0.0 is a circle.

Consider now in FIG. 7 a right circular cone with element OL horizontal and in the plane of the drawing. Let ω represent the angle which said element makes with the axis OC of the cone, also in the plane of the drawing. Through a point P along element OL, at a distance $l$ from the apex of the cone, I have drawn lines 1, 2, 3 and 4, representing four planes perpendicular to the plane of the page sectioning said cone. Plane 1 is perpendicular to the axis of the cone and sections the cone in a circle. Plane 2 is parallel to element OL' and sections the cone in a parabola. Plane 3 is perpendicular to element OL and sections the cone in a hyperbola. Plane 4 is parallel to the axis of the cone and sections the cone in a hyperbola of greatest possible eccentricity for said cone. In this example, the conic sections produced by sections between planes 1 and 2 are ellipses. The eccentricity $e$(conic) of the conic section produced by sectioning the cone is given by the following equation:

$$e(\text{conic}) = \sin(\omega + \phi) \sec \omega \quad (19)$$

where $\phi$ is the angle measured from that plane perpendicular to element OL to the sectioning plane, $\phi$ being negative when the sectioning plane is angled clockwise with respect to said plane perpendicular to element OL and positive when angled counterclockwise with respect to said plane.

The apical radius of curvature of the conic is given by the following equation:

$$r(\text{apical}) = l \tan \omega |\cos \phi| \quad (20)$$

In the production of the variable surface of the lens of this invention, I used in the apparatus a right circular cone as a cam, hereinafter called the cone cam, for the production of all transverse sections of the variable surface, of eccentricity 0.0 and greater. A circular cam follower, capable of motion parallel only to a single vertical plane perpendicular to the horizontal axis of said cam follower and perpendicular to the vertical plane containing the axis of the cone cam and element OL, is made to roll across element OL in a predetermined sequence of distances $l$ and a corresponding predetermined sequence of angles $\phi$, both positive and negative, to move in circular, elliptical, parabolic and hyperbolic arcs. Simultaneously, with each adjustment of the predetermined sequence of adjustments of the cone cam, there is an associated adjustment of a predetermined sequence of incremental rotations of the evolute cam to which a work holder and lens workpiece have been attached. A rotating circular diamond edged generating tool moving across the workpiece in pathways parallel to said circular cam follower and on a common axis, the generating tool and the cam follower being of equal diameter, forms the basis of the apparatus and method of production of the variable surface of the lens of this invention.

In FIG. 10, line GB is the base line of vertical face Q of plate L along which evolute cam face EC, being the evolute of the principal curve to be formed on the lens, of cam R rolls vertically upward as it is rotated counterclockwise in the plane of the drawing. Cam R is controlled by rod 16 passing through slide 11 reciprocatably in way block 110 by actuator 10, threaded in fixed block 111 and fixed in slide 11 but rotatable relative thereto. The adjustment is by knob 21. A plane, perpendicular to the plane of the drawing, containing the face Q and line GB, is hereinafter called the generating plane. Attached to plate L by a pair of bolts or screws, not shown, is a sliding cam SC which is exactly calculated to support, at the proper height, the lower edge of evolute cam face EC as said evolute cam rotates without sliding up vertical face Q. Horizontal bar LB fixed to, and spanning way block 110, supports plate L and cam SC. The work holder WH attached rigidly to arm D which extends rigidly but adjustably from evolute cam R, has affixed to it by means of pitch or other adhesive or mechanical means, the workpiece WP which consists of a lens blank 70 mm in diameter, or other suitable diameters, with its upper or exposed surface curve approximately like the desired finished variable surface. The position of the work holder and workpiece is such that the lens blank surface is bisected by a central plane through GB, which plane is perpendicular to the generating plane. The work holder is attached to arm D by horizontal slide HS and lock screw LH while arm D is attached to the evolute cam by vertical slide VS and lock screw LV. By means of slide VS, the height of the workpiece is set slightly above the level of point B and locked in position by lock screw LV. By means of slide HS, the work holder is adjusted to such position on arm D that during the process of generating the variable surface, th axial point will be at the geometrical center of the generated workpiece, i.e., the normal to the principal curve which is tangent to the evolute at point G will coincide with the minor axis of the elliptical arc portion of the princial curve. However, in some cases the work holder is adjusted so that the axial point is at some other desirable point on the principal curve of the lens.

Attached to platform T are two vertical support arms, SA, each bored at the upper end horizontally and parallel to the generating plane and each bore bearing a cylindrical rotatable cam pin on a common horizontal axis ZZ', hereinafter called the cam axis, which is parallel to the generating plane and at the same level as point B in the generating plane. Extending downward from and perpendicular to said rotatable cam pins are parallel cam supports, shaft AA and worm gear Y, both of which in turn are attached perpendicularly to horizontal cam slide assembly K which is at all times parallel to cam axis ZZ'. Resting on slideways in slide assembly K is a portion of a right circular cone, the cone cam CC whose uppermost element OL is parallel to slide assembly K, which element lies in the plane which contains base line GB and is perpendicular to both the generating plane and the cam axis ZZ', which plane is hereinafter called the central plane. The central plane containing element OL and the axis of cone cam CC divides the cone cam symmetrically. By means of the cam pins, slide assembly K is rotatable about cam axis ZZ' and said angular rotation is accurately adjustable by means of worm gear Y and worm W, as indicated by pointer 56 on scale 57, and the amount of angular rotation may also be indicated by means of pointer P' (on pedestal 55) on radial dial D', or alternatively by means of a flexible shaft from worm W to a mechanical counter, not shown.

Cone cam CC by means of screws MS is movable along slideways SS, as shown in FIGS. 12 and 14, in directions toward and away from the generating plane.

The control point CP (FIG. 11) for this movement is at the intersection of cam axis ZZ' and the central plane and always lies on element OL and at the same level as point B. This adjustment is indicated by pointer 50 on scale 51 or by pointer 52 on scale 53 or the amount of movement may be indicated by a mechanical counter connected to screw MS by a flexible shaft, not shown.

Resting on cone cam CC is circular cam follower CF which has a sharp circular edge which lies in a vertical plane which also contains cam axis ZZ', said plane hereinafter called the cam plane. Cam follower CF is attached by linkages to table T such that it can roll across cone cam CC, the sharp circular edge of said cam follower always remaining in the cam plane, the axis of said cam follower always remaining perpendicular to the generating plane. A diamond edged generating tool GT in the form of a rotatable circular disc of the same diameter as the cam follower and having a sharp circular edge, is supported by said linkage such that its abrading edge lies in the generating plane. Said generating tool is perpendicular to, and coaxial with, said cam follower axis and is made to rotate rapidly about said axis by motor M, attached to the tool by flexible shaft 40.

As stated previously, the variable surface below the great arc has an increasing eccentricity, e(transverse), of successive transverse sections along the principal curve from the axial point downward. The eccentricity of said conic transverse sections may increase uniformly along the principal curve or may increase in an accelerated manner, depending upon the desired lateral effects at given levels down the lens. A very satisfactory design utilizes a uniform rate of increase in eccentricity per unit distance a down the lens. Expressed as a differential equation:

$$(de/da) \text{ (transverse)} = k \qquad (21)$$

As an example, $k$ may be a value of 0.5 eccentricity units per cm down the lens or in terms of meters, 50 eccentricity units per meter. This would be an increase of 0.005 eccentricity units for each successive conic transverse section when $a$ increases in steps of 0.0001 meters.

To calculate the required valves of $\phi$ (see FIG. 7) as the adjustments of the angle of slide assembly K necessary for the production of the desired eccentricities e(transverse) of the conic transverse sections, for successive values of $a$, equation (19) can be rewritten as follows:

$$\phi = \sin^{-1}[e(\text{transverse})\cos\omega] - \omega \qquad (22)$$

where e(transverse) replaces e(conic) of equation (19).

Having determined the required values of $\phi$ and having determined the values of $r(a,b)$(transverse) along said lower portion of the principal curve, the values of $l$ may be determined from equation (20) rewritten as follows:

$$l = \frac{r(\text{apical})}{\tan\omega\cos|\phi|} \qquad (23)$$

where $r(\text{apical}) = r(a,b)$(transverse). Thus the required adjustments of $\phi$ and $l$ of the cone cam are determined for the production of the desired transverse sections of the variable surface.

In the generation of the variable surface of the lens of this invention having a spherical portion above the great arc, the cone cam is adjusted to the values $\phi = -\omega$ and $l = r(\text{apical})/\sin\omega$ where $r(\text{apical})$ is equal to the value $r(\text{axial})$.

Starting with the cone cam set at the values as above determined, and the evolute cam pivoted about a horizontal line through point G in the generating plane, at the intersection of vertical face Q and the bearing surface of sliding cam SC, and such that the edge of the workpiece farthest from the cone cam is just at the generating plane, the cam follower is made to roll back and forth across the cone cam while the generating tool GT is rotating rapidly.

The apparatus for rolling the cam follower CF and the generating tool GT back and forth across the workpiece is best understood from FIGS. 10 and 11 of the drawings. It is sufficient if such apparatus permits travel of the generating tool and the cam follower completely across the work. For example, mounted rigidly on the table T are two clevis blocks 23 and 24 in which are oscillatably mounted two generally vertical arms 25 and 26 which rotate about horizontally aligned pins 27 and 28. The upper ends of arms 25 and 26 are pivotally connected through bearings 25', 25' with a unitary cross rod 29. Collars 26', 26' hold rod 29 in place. Parallel, generally horizontal arms 30 and 31 are pivotally mounted on cross rod 29 by bearings 30' and 31'. On the ends of arms 30 and 31 most remote from the vertical arms 25 and 26 are fixedly mounted at right angles two horizontally spaced pairs of support arms 32 and 33. The arms 30, 31, 32 and 33 are rigidly held together by horizontal plate 34 and vertical plate 35 as well as by bolts 36 and 37. At the lower ends of the support arms 32, a shaft 38 is rotatably mounted in bearings 39 and the generating tool GT is fixedly mounted concentrially on shaft 38 between the arms 32. This shaft is rotated by means of motor M, having a fixed mounting, not shown, through a flexible drive cable 40. At the lower end of the arms 33, a short shaft 41 is rotatably mounted in bearings 42, and fixed on shaft 41 is the cam follower CF in such a position that it is axially aligned with the shaft 38. It should be understood that the generating tool GT and the cam follower CF are of the same diameter and the the edge shape may be as shown in FIG. 15 or FIG. 16. It should be understood in FIG. 11 that the generating tool GT is directly behind the cam follower CF and arm 25 is directly behind arm 26.

The slide assembly K is best understood from FIGS. 10, 11 and 12. Rigidly mounted on the table T are a pair of blocks 43 and 44 aligned perpendicular to the axis of the clevis pins 27 and 28. To each of these blocks a support arm SA is rigidly attached in a vertical position. At the upper ends of these support arms, pivotally connected by pins 45 and 45', are vertical arm AA and worm gear Y which are parallel to the arms SA. Rigidly connecting the lower ends of the arm AA and worm gear Y are parallel generally vertical spacing bars 46 which are rigidly connected, centrally, by a way block 47, generally U-shape in section. End plates 47a are fixed at each end. The cone cam CC has a dove tail downward extension 48a which is complementary to, and a sliding fit in, the slide ways SS in the block 47. The cone cam CC has a further downward projection 48b in the form of a downwardly extending tongue, through which extends a female thread 49 extending longitudinally of the cone cam. The threaded screw MS, parallel to cone cam element OL, is rotatably mounted in the members 47a and passes through and cooperates with the thread 49 when manipulated by the knob 22 at the right-hand end of the screw MS as clearly seen in FIG. 10. The uppermost element of said cone cam, as marked OL in FIGS. 10 and 12, corresponds to the straight line element OL of the cone which was previously described in connection with FIG. 7. The manipulation of the knob 22 and the action of the threaded screw MS in the female thread 49 serves to adjust the dimension $l$ as indicated in FIG. 7. The position of the cone cam CC and the extending tongue 48b of the same as indicated in FIG. 14 shows how these parts have moved toward the right from the position shown in FIG. 10. This position is indicated by the pointer 50 which is mounted on the block 47 and reads on a scale 51 carried by the cone cam CC. There is also an indication of this movement by the pointer 52 which reads on a scale 53 carried by the knob 22.

The worm gear y serves to rotate the slide assembly K about the axis ZZ in a manner illustrated in FIG. 14. The worm gear Y is rigidly attached to the bar 46 of the slide assembly K as shown in FIG. 12. This gear is substantially semi-circular in extent. The worm W rotates in block W' fixed to one of the supports SA as seen in FIG. 12 and is part of shaft 54. The graduated knob D' serves to turn the shaft 54 and the worm W and such adjustment is indicated on the knob D' by the pointer P'. Such adjustment is also read by the pointer 56 rotatable with pin 45' and reading on scale 57 which is mounted on one of the support arms SA. This adjustment sets the value of the dimension $\phi$ indicated in FIG. 7.

At the end of each oscillation of the cam follower CF, screw 10, attached to slide 11, is rotated a predetermined amount by knob 21. Sleeve 12, affixed to slide 11 by collar 13, pins 14 and 14' and support blocks 15 and 15', is freely rotatable about the axis of pins 14 and 14' which is perpendicular to the central plane. See FIG. 13. Shaft 16, snugly and slidably fit within sleeve 12, is caused to move with slide 11 and to rotate evolute cam R and cam face EC, which is held firmly without sliding against vertical face Q by springs S and S', a predetermined angular increment, indicated by pointer P, attached to pin 14, on scale 17, and more exactly by calibrated linear scale 17', attached to slide 11, thereby advancing the surface of the workpiece through the generating plane. For the specific example, some of the data for which is indicated by the asterick in Table 3, an incremental amount of angular rotation of the evolute cam of 0.045463° advances the surface of the workpiece through the generating plane an amount of 0.0001 meters as measured along the upper portion of the principal curve. Such oscillations and angular rotations of the evolute cam are repeated until the first or upper portion of the variable surface above the great arc is generated as a spherical portion, a total angular rotation of 15.9124°. Thereafter to generate the second or lower portion of the variable surface below the great arc, at the end of each succeeding oscillation of the cam follower, the cone came is adjusted by means of knobs D' and 22 respectively to the succeeding values of $\phi$ and $l$ to produce the succeeding values of r(transverse) and e(transverse), while the evolute cam is adjusted for each oscillation to advance the workpiece through the principal plane as said evolute cam rolls up vertical face Q, supported by sliding cam SC, until the second portion of the variable surface is completely generated.

In this operation, the oscillation of frame 25, 26, 29 (carrying the cam follower CF and generating tool GT) is caused by actuating handle 29a but it is understood that this might be motorized.

An alternative procedure for producing the variable surface in which the upper portion is spherical is to start with a preground lens blank workpiece having a central axis and a convex spherical surface of the desired radius of curvature, +4.15 diopters, for example. The workpiece with its convex spherical surface facing upward is fixed to the work holder such that its axis can also be the axis of the variable surface at the completion of the generating. Evolute cam R is rotated initially the full 15.9124° so that the center of the workpiece convex upper surface is at point B and the axis of said blank passing through B and normal to said convex surface coincides with line GB. The height of the workpiece is adjusted so that the diamond edged generating tool, GT, just contacts the workpiece. The generating process then proceeds as described above for the completion of the lower portion of the variable surface.

In Table 3, I have listed for the corrected curve lens of this invention embodying the specific example some of the values of $a$, ranging from 0.0000 to 0.0350 meters, and the corresponding values of r(vertical), r(transverse), $\gamma$, $\phi$, and $l$, and e(transverse), for a ½ cone angle of $\omega = 60°$ (total angle at apex $2\omega = 120°$) and a value of $(de/da)$(transverse) = 0.005 $e$ units per meter, where $\phi$ and $l$ have been calculated by means of equations (22) and (23) for each point P(a,b) along said lower portion of the principal curve.

As the second example, consider a variable surface for the cataract range of lenses in which the elliptical arc serving as the upper portion of the principal curve is joined at its prolate point to the elliptical arc serving as the lower portion of the principal curve, at its oblate point. In FIG. 8, drawn to scale, I have shown principal curve QBP with elliptical arc QB joined at its prolate point to elliptical arc BP at its oblate point, the refractive power at the axial point being +14.00 diopters for refractive material of crown glass having an index of refraction of $n$ = 1.523. The ellipse providing the upper portion of the principal curve QB, and the great arc, has an eccentricity of 0.5790. The radius of curvature at the axial point r(axial) is 0.0373571 meters. The semi-major axis of length A' and the semi-minor axis of length B' of the ellipse providing the upper portion of the principal curve and of the great arc is 0.0561962 meters, and 0.0458148 meters respectively.

Table 3

| a<br>Meters | r(vert)<br>Meters | r(trans)<br>Meters | Degrees | $\phi$<br>Degrees | Meters | e(trans)<br>Eccentricity |
|---|---|---|---|---|---|---|
| 0.0000 | 0.126024 | 0.126024 | 0.0000 | −60.0000 | 0.1455200 | 0.0000 |
| 0.0050 | 0.124809 | 0.124809 | 2.2812 | −52.8192 | 0.1192360 | 0.2500 |
| 0.0100 | 0.1211186 | 0.121186 | 4.6111 | −45.5225 | 0.0998619 | 0.5000 |
| 0.0150 | 0.115229 | 0.115229 | 7.0440 | −37.9757 | 0.0839416 | 0.7500 |
| 0.0200 | 0.107058 | 0.107058 | 9.6464 | −30.3000 | 0.0713720 | 1.0000 |
| 0.0250* | 0.096852 | 0.096852 | 12.5078 | −28.3178 | 0.0600246 | 1.2500 |

Table 3-continued

| a Meters | r(vert) Meters | r(trans) Meters | Degrees | φ Degrees | Meters | e(trans) Eccentricity |
|---|---|---|---|---|---|---|
| 0.0300 | 0.084850 | 0.084850 | 15.7597 | −11.4096 | 0.0499965 | 1.5000 |
| 0.0350 | 0.071365 | 0.071365 | 19.6145 | 1.0450 | 0.0412095 | 1.7500 |

A series of values of $a$ for said upper portion of the principal curve can be calculated from the following equation:

$$a = A'(1 - b^2/B'^2)^{1/2} \quad (24)$$

for values of $b$ ranging from 0.0000 to 0.0275 meters, $b$ increasing in steps of 0.0001 meters, or less if desired. Semi-finished cataract lens blanks are generally no longer than 5.5 centimeters in diameter so that the maximum value of 0.0275 meters for $b$ is adequate.

For each point $P(a,b)$ along the upper portion of said principal curve there is an angle $K$ between the normal to said curve at $P(a,b)$ and the major axis of the ellipse providing said portion of the principal curve, where, substituting $K$ for $\theta$ in equation (13):

$$K = \tan^{-1} \frac{b}{a(1-e^2)} \quad (25)$$

A set of values of angle $K$, can thus be calculated for the corresponding set of coordinate values $a$ and $b$. For each of said points $P(a,b)$ along said portion of the principal curve about the axial point, the value of the radius of curvature of the elliptical transverse section, $r(a,b)$(transverse), at its prolate point can be computed from the following equation:

$$r(a,b)(\text{transverse}) = (b/\sin K K) \quad (26)$$

The eccentricity $e$(transverse) for each of the series of elliptical transverse sections of said prolate ellipsoid upper portion of the variable surface having an eccentricity of $e$(prolate) is obtained from the following equation:

$$e(\text{transverse}) = e(\text{prolate}) \cos K \quad (27)$$

To calculate the required values of $\phi$ for the adjustments of slide assembly K necessary for the desired values $e$(transverse) of the transverse sections of said upper portion of the variable surface, equation (22) is used. Having determined the required values of $e$(transverse), and the values of $r(a,b)$(transverse) obtained by means of equation (26), the values of $l$ may be determined by means of equation (23), the values of $r(a,b)$(transverse) being used for $r$(apical).

$r(a,b)$(vertical) may be calculated for each of said points $P(a,b)$ by means of equation (1), or alternatively, by means of the following equation:

$$r(a,b)(\text{vertical}) = \frac{r(a,b)(\text{transverse})}{1 - e(\text{prolate})^2 \sin^2 K} \quad (28)$$

The evolute cam in this case is composed of two adjoined geometrical parts; the evolute for the elliptical arc QB used as the upper portion of the principal curve, and the evolute for the elliptical arc BP used as the lower portion of said principal curve, both evolute portions being continuous at point G of FIG. 8. Arc portion LG is that portion of evolute G'G related to QB and arc portion GM is that portion of evolute GC related to BP.

The coordinates for the portion LG of evolute G'G are determined in the same manner as the coordinates for the portion GM of evolute GC. The coordinates $a$ and $b$ for the series of points $P(a,b)$ along the portion of said principal curve above the axial point are used to compute a sequence of values $\alpha$ and $\beta$ by means of equation (17) and (18), K being substituted for $\phi$, and said computed values are used as coordinates for machining that portion of the combined evolute cam corresponding to the upper portion of the principal curve.

In the actual generating process for this cataract lens, the workpiece, curved approximately like the desired variable surface is attached to the work holder and positioned such that its edge farthest from the cam plane is just at point B of the generating plane. As the cam follower CF is made to roll back and forth across the cone cam CC, the generating tool GT is rotating rapidly and removing lens material. At the end of each oscillation of the cam follower, evolute cam R is rotated a predetermined angular increment by turning knob 21 to roll cam face EC up vertical face Q of plate L and advance the workpiece through the generating plane. Simultaneously, the cone cam is adjusted arcuately from its initial setting a predetermined angular increment, calculated as taught herein, by knob D', and moved along slide assembly K by indicator knob 22, each angular position of evolute cam R for the upper half of the variable surface and angular position $\theta$ for the lower half of the variable surface corresponding to the predetermined angular position $\phi$ and linear position $l$ of the cone cam. This process is continued until the entire variable surface is generated.

In an alternative procedure for producing the variable surface of the cataract lens of this invention, a preground lens blank workpiece is used in which the upper convex surface with its axis central is a prolate ellipsoid of the desired eccentricity and apical radius of curvature. The workpiece with its convex ellipsoid of revolution facing upward is fixed to the workpiece holder such that its axis can be the axis of the variable surface at the completion of the generation. Evolute cam R is rotated counterclockwise until the apex of the workpiece surface is at point B and the axis of said surface coincides with line GB. The height of the workpiece is adjusted so that the diamond edged generating tool GT just contacts the workpiece. The cone cam is adjusted to the values of $\phi$ and $l$ by means of knobs D' and 22 so that the generating tool in its oscillation across the workpiece will produce the desired conic transverse section for the value of $\gamma$ of evolute cam R. With each subsequent oscillation of the cam follower across the cone cam, evolute cam R is rotated to a new setting while the cone cam is likewise reset. This process is continued until the lower portion of the variable surface is completed. for the In order to generate the variable surface which symmetry about the axis and about or across each of the principal planes, the generation of the variable surface commences at the mid-point of the lens as described above the lower half of the surface. At the completion of this portion of the variable surface, the work holder and attached workpiece are removed from arm D, rotated 180°, replaced in the original position on horizontal slide HS and locked in position by lock screw L. Again the generation commences from the mid-point of the lens. At the completion of generation, the variable surface will be symmetrical about the axis of the lens and about both principal planes.

In order to generate a variable surface in which the portions on either side of the great arc are similar but not identical, the generation of the variable surface commences at the midpoint of the lens as described above. At the completion of this portion of the variable surface, the work holder and attached workpiece are removed from arm D. The evolute cam is also removed and replaced with another evolute cam which produces a principal curve having the same $r$(axial) value as that produced by the initial evolute cam but which produces an otherwise different principal curve. The work holder and attached workpiece are then rotated 180° and replaced on horizontal slide HS and locked in position by lock screw LH. The height of the workpiece is then adjusted on vertical slide VS and locked in position by lock screw LV. The second half of the variable surface is then generated in a manner similar to that of the first half.

In the description of the invention, I have shown and described the cam follower with a sharp circular edge, see FIG. 15. In actual practice, the sharp circular edge is subject to wear as the cam follower rolls repeatedly across the cone cam. Instead of a cam follower with a sharp circular edge, a toric edged cam follower may be used with advantage to produce the variable surface of the lense of this invention with only minimal differences in the shape of the surface produced. Such a cam follower is shown in FIG. 16. The advantage of a toric edged cam follower is primarily its durability compared to that of the sharp edged cam follower, but it also permits the production of a variable surface in which the transverse sections are modified slightly from true conic shape and in which the eccentricity of each of said modified conic transverse sections having an apical point of a specific curvature differs from that produced by a cam follower with a sharp circular edge producing the same apical curvature.

At the completion of the generation of the variable surface of the lens of this invention, marks left by the circular abrading tool consisting of fine pits and scratches along transverse circular and conic arcs must be removed by grinding the surface in preparation for polishing. The repeated cuts of tool GT across the workpiece are so closely spaced that only fine grinding and polishing are necessary to finish the variable lens surface without substantial change in its originally formed shape. For this purpose I may use my Lens Grinding Apparatus, described in my U.S. Pat. No. 3,583,111, patented June 8, 1971, When grinding is complete and the surface is uniformly smooth, it is polished with cerium oxide or rouge abrasive in conjunction with a conforming polishing pad of felt or Nylon cloth sheet material which permits the polishing pad to conform to the surface contour over a broad area with relatively uniform pressure, while there is continuous relative motion between said surface and the polishing pad.

FIG. 9 is a diagrammatic representation of an oblique top view of the semi-finished corrected curve lens of this invention, partial data for that portion below the great arc being shown in Table 3, in which the variable surface WQVP is spherical above the great arc and progressively increasing in curvature below the great arc. Both the great arc and the principal curve are marked with a thin line of water-proof ink to aid in finishing the posterior surface in accordance with the patient's prescription. The posterior surface is left spherical. The thickness of the semifinished lens is approximately 8 mm at its thinnest portion to allow for generating, grinding and polishing of the posterior surface by a prescription shop.

Superimposed on the variable surface of FIG. 9 is the outline in full lines of a possible finished lens area which could represent the front surface of a finished ophthalmic lens. Other possible positions may be utilized for said finished lens area, wherein more spherical lens area is available for distance vision and less for near vision, or vice versa. Also a half lens is possible as shown in dot-dash lines.

The separation of 0.0250 meters between the axial point and the add point used in the specific example as marked * in Table 3 was used for the purpose of description, and other separations, 15, 18, 20, 22, 28 or 30 mm as example, are included in this invention.

In utilizing the semi-finished lens of this invention for completion as a non-cataract ophthalmic lens, the appropriate base curve semi-finished lens is first selected. Using the inked great arc and principal curve lines, as shown in FIG. 9, as guides, the variable surface is made adherent by means of pitch or other adhesive, to a lens block. The lens is positioned on said block so as to utilize the desired portion of the variable surface for the completed ophthalmic lens and to provide the correct principal meridians when a toric surface is to be the back surface of the lens. The concave surface of the lens is then generated, ground and polished in the usual manner for opthalmic lenses to reduce the lens to normal thickness and to incorporate the correction for the wearer's refractive error. The lens is then edged to the desired size and shape to fit a spectacle frame.

The semi-finished cataract lens of this invention is supplied to the prescription shop in terms of the power of the variable surface at the axial point, there being a large series of such lenses to cover a large range of prescriptions for aphakia. The add for each lens in such a series may be set for a specific value, +2.50 diopters, for example, for a given distance below the axial point, 20 mm for example. A similar series may be produced with the add +3.00 diopters, or +3.50 diopters, etc.

Although for the purpose of this specification the principal curve described and used in the specific example is elliptical below the axial point, this invention includes other principal curves having an axial umbilical point where $D'$(axial) vanishes. Although I have described the transverse sections below the great arc as conic, this invention includes those substantially conic transverse sections which are produced when the edge of either, or both, the circular cam follower CF and the circular generating tool GT, is toric rather than sharp edged.

A second embodiment of this invention is shown in FIGS. 17 to 23. While the first embodiment provides transverse curves which may be conics whose eccentricity is less than 1.0 or equal to 1.0, or greater than 1.0, this second embodiment can provide transverse curves on the unique variable surface which are conics and always elliptical arcs of eccentricity less than 1.0. For this embodiment a circular cam is substituted for the cone cam of the first embodiment. However, a very large number of useful lenses may be constructed using this second embodiment.

In FIGS. 17, 18 and 19, the mechanism at the left-hand part of the drawing, where the tool GT' cuts the workpiece WP' in the work holder WH', is exactly like that described in connection with the first embodiment although details have been omitted from the drawings. At the right-hand part of the drawing the pattern followed includes a circular arc cam C movable about a vertical radius as its axis to provide various ellipses when projected horizontally toward the left. When the axis of the cam follower lies in the central plane, the control point, see FIG. 17, is the highest point CP', of the circuit cam C, which lies in the central plane. The cam follower CF' is a cylinder so as to maintain contact with the circular cam pattern in various oriented positions of the latter.

The parts associated with the lens generating operation at the left of FIG. 17 are given the same reference characters as in the first embodiment with a prime suffix.

If said circular cam C of radius $r$ is rotated about a vertical diameter, between the full line and dot-dash positions of FIG. 17, the perpendicular projection upon the generating plane through G'B' is in ellipse whose eccentricity is given by the expression;

$$e = \sin \phi \qquad (29)$$

where $\phi$ is the angle of rotation of said circular cam from its original position (in full lines). The apical radius of curvature of said ellipse $r$(apical) is also a function of $\phi$, and therefore of $e$, and is given by the equivalent expressions:

$$r(\text{apical}) = r \cos^2 \phi, \text{ and} \qquad (30)$$

$$r(\text{apical}) = r(1 - e^2). \qquad (31)$$

Thus, the circular cam C capable of being rotated through a predetermined sequence of angular increments about its vertical diameter as an axis can provide the basis for producing a predetermined sequence of elliptical arcs, each of which increases in apical curvature and eccentricity. To calculate the required sequence of values of positions $\phi$ of said circular cam of radius $r$ for a sequence of values of $r$(transverse), equation (30) is rewritten as follows:

$$\phi = \cos^{-1} \left[ \frac{r(\text{transverse})}{r} \right]^{1/2} \qquad (32)$$

where the sequence of values of $r$(transverse) have been determined as previously described by means of equation (14) and those preceding it. The eccentricities $e$ of said elliptical transverse sections are obtained by means of equation (29), using the values of $\phi$ obtained by means of equation (32).

The use of such an upright circular cam which is rotated incrementally in a predetermined manner simultaneously with the predetermined incremental rotation of said evolute cam R' (the pattern for which is mentioned hereinabove) to which a work holder and lens workpiece have been attached, forms the basis of the apparatus to produce the variable surface of the lens of this second embodiment of my invention.

In FIG. 17, line G'B' is the base line of a vertical linear plate surface Q' along which the evolute cam face EC' formed on cam R' rolls vertically as it is rotated counterclockwise in the plane of the drawing. The right-hand surface Q' of vertical plate L', secured to bar LB' and slide 11, and perpendicular to the plane of the drawing, contains line G'B' and is hereinafter called the generating plane. The adjustment screw 10' with micrometer attachment 21' is attached to slide 11' through which passes a sleeve 12' affixed to slide 11' by a collar 13', pins on the axis 140 similar to pins 14 and 14', previously described, and support blocks like those 15 and 15' previously described in the first embodiment. This makes sleeve 12' freely rotatable about the axis of pins 14 and 14' which is perpendicular to the central plane. Shaft 16', which snugly and slidably fits within the sleeve 12', is caused to move with slide 11' and to rotate the evolute cam R', which is held firmly without sliding against the vertical face Q' by springs S1 and S2. The cam R' is guided by its lowermost edge at G' traveling along cam SC'. The angular increment of movement of cam R' is indicated by pointer P', attached to a pin on the axis 140 and is read by protractor scale 17' attached to the slide 11'.

Attached to platform T, at the right-hand side of FIG. 17 is a horizontal circular table, F, rotatable in recess R about a central vertical axis which is parallel to line G'B' and in a common plane, hereinafter called the central plane, perpendicular to both the generating plane and platform T'. Rigidly attached to horizontal table F and cam base CB is an upright circular arc cam C of hardened steel plate with a wedge shaped central portion coming to a sharp circular edge of radius $r$, hereinafter called the cam circle, a radius of said cam circle coinciding with said vertical axis, hereinafter termed the circular cam axis. The plane containing the cam circle and circular cam axis is termed the circular cam plane. The highest point CP' of the cam circle which is at the circular cam axis in said central plane is at the same level as point B' on the base line of vertical face Q'. Resting upon the circular cam circle is a cylindrical cam follower CF' freely rotatable on shaft 67 supported by ball bearings (not shown), and attached to table T' by a structure including shelf 60, and frame linkages 61, 63, 64, 69 which permit said cam follower to roll along said circular cam while always maintaining the axis of said cam follower perpendicular to the generating plane. Spring 73 maintains this contact.

These frame linkages are best understood from FIGS. 17 and 23. A shelf 60 is fixed to the two parallel side frame members 61 which carry horizontal shaft 62 and also serves as linkages This shaft is rotatably connected by two pairs of parallel links 63 on the left in FIG. 17 and 64 on the right in FIG. 17. The lower ends of the links 63 and 64 are rotatably mounted on the shaft 65 which is held at opposite ends in two blocks 66 secured to table T'. The cam follower CF' is carried by a shaft 67 which is fixedly mounted in the side frame members 61. This shaft passes through an open slot 68 in a handle lever 69 operable by handle 69a. This lever is oscillatably mounted on a pin 70 held in a block 71 fixed to table T'. The lower end of the lever 69 is held in a clevis in block 71 (not shown) which, on opposite sides of the lower end of lever 69 carries adjustable screw stops 72 (FIG. 17) to limit the oscillation of lever 69. A diamond edged generating tool GT' in the form of a rotatable circular disc, of the same diameter as the cam follower CF', is supported by bearings within bracket sleeve 74 rigidly attached to linkage 61 such that its abrading edge lies in the generating plane through G'B'. Said abrading tool is perpendicular to, and coaxial with, said cam follower axis and is made to rotate rapidly on its shaft 75 about said axis by belt 76 and shaft 77 supported by bracket 78 and driven by motor M' supported on shelf 60.

In the generation of the variable surface of the lens of this invention, where the portion above the great arc is spherical, the circular cam plane is first set at the zero position in which it is parallel to the generating plane, seen in full lines in FIG. 17. The radius of curvature of the cam circle, r, is equal to r(axial). The work holder attached rigidly to arm D' which extends from evolute cam R', has affixed to it by means of pitch or other adhesive or mechanical means, the workpiece WP' which consists of a lens blank 70 mm in diameter with the upper or exposed surface curved approximately like the desired finished variable surface. The position of the work holder WH' and workpiece WP' is such that the lens blank surface is bisected by the central plane. The work holder is attached to arm D' by suitable means adjustable like slide HS while arm D' is attached to evolute cam R' adjustable like slide VS in such position that during the process of generating the variable surface, the axial point will be at the geometrical center of the generated workpiece, i.e., the normal to the principal curve which is tangent to the evolute at point G' will coincide with the minor axis of the elliptical arc portion of the principal curve below the great arc.

Starting with the cam plane at the zero position and the evolute cam R' pivoted about a horizontal line through point G' in the generating plane and such that the edge of the workpiece farthest from the circular cam plane is just at the generating plane, the cam follower CF' is made to roll back and forth along the circular cam C while the generating tool GT' is rotating rapidly. At the end of each oscillation of the cam follower, evolute cam R' is rotated by wheel 21' a predetermined amount about said horizontal line through point G' as previously described in the first embodiment, thereby advancing the surface of the workpiece through the generating plane. Such oscillations and angular cam rotations are repeated until that portion of the variable surface above the great arc is generated as a spherical portion. Thereafter at the end of each succeeding oscillation of the cam follower, the circular cam plane is rotated by wheel 80, worm 81, worm wheel 82 and shaft 85 a predetermined angular increment $\phi$ calculated by means of equation (32), read at pointer 83 on indicia 84, while evolute cam R' is also rotated a predetermined amount, and continues to advance the workpiece through the principal plane as it rolls without sliding up cam plate surface Q', until the second portion of the variable surface below the great arc is generated. Oscillation of shelf 60, frame 61, the cam follower CF' and the generating tool GT' may be made manually using handle 69a. It is understood that this oscillation could be caused by a motor, if desired.

Other than the changes above described, lenses are formed by the second embodiment the same as in the first embodiment.

At the completion of the generation of the variable surface of the lens of this invention, marks left by the circular abrading tool consisting of the fine pits and scratches along transverse circular and elliptical arcs, must be removed by fine grinding and polishing as in the case of the first embodiment.

Comparing FIG. 20 with FIG. 18, there is shown an alternate way of preventing slippage as the evolute cam face EC or EC' rolls on the coacting vertical cam plate face Q or Q'. In FIG. 20, the vertical face Q' is provided with a rack 90 and the evolute cam face EC' is provided with coacting gear teeth 91. Note that no guiding cam surface such as that shown at SC and SC' is necessary with this construction and the point G'' coincides with the position G and G' previously described. This construction for preventing slippage between the evolute cam and its coacting vertical cam plate may be used in either the first or second embodiment of this invention.

In the description of both the first and second embodiments of the apparatus and method of this invention, I have shown the coaxial cam follower and generating tool as oscillatory across the cam and workpiece and a fixed center plane. It should be understood that such motions are relative and that identical effects can be achieved and are included within the scope of this invention with the apparatus constructed such that the workpiece, cam and center plane oscillate together in a direction horizontal and perpendicular to said center plane while the coaxial cam follower and tool are held fixed except for substantially vertical oscillation.

Although this specification has been directed primarily at ophthalmic lenses to be used in spectacles, it is also intended to be used for corneal contact lenses which differ from the spectacle lens only in magnitude but not in optical principles.

Where there is mentioned herein a curvature at a "point", it should be understood as referring to the curvature of an infinitesmally small line or surface at such point.

The term "cut" as used herein in the specification and claims means "abrade" also.

What is claimed is:

1. A multifocal ophthalmic lens of homogeneous transparent optical material, useful for the correction of the refractive error and the accommodative insufficiency or absence of accommodation in presbyopia and aphakia, having a geometrically and optically continuous variable convex front surface at least a portion of which changes continuously and regularly in refractive power, and a coacting coincoid conicold surface of eccentricity zero or greater or toric back surface, said variable front surface characterized by having a single pair orthogonal principal planes each of said planes of said pairs intersecting said variable convex front surface normally at all points, the first of said principal planes, generally horizontal in use, intersecting said front surface normally in a conic great arc of eccentricity zero or greater, the derivative of curvature of said variable front surface vanishing at said great arc at least in sections by all planes orthogonal to it, said arc providing a unique tangential junction between an upper and a lower portion of said variable front surface, there being geometrical and optical continuity and a continuous and regular change in curvature and refractive power in crossing said conic great arc, without localized distortion in the field of vision through said lens, the second of said principal planes being a generally vertical plane of symmetry of said variable front surface, intersecting orthogonally said great arc and said first principal plane and forming the axis of said variable front surface, said axis intersecting the center of curvature of said great arc when its eccentricity is zero and coinciding with the major axis and intersecting both foci and the center of curvature of the apex of said great arc when its eccentricity is greater than zero, and intersecting said variable front surface normally in a principal curve in which, at the point where said axis intersects said variable front surface, namely, the axial umbilical point, the curvature of said great arc and said principal curve are equal, the derivative of curvature of said principal curve and of said great arc of said variable front surface in all meridian sections containing said axis, vanishing or zero at said axial umbilical point, said principal curve at least below said great arc, increasing in curvature and refractive power downwardly in a continuous and regular manner and at an accelerated rate with increasing distance from the axial umbilical point of said variable front surface, all transverse sections of said variable front surface below said great arc, by planes orthogonal to said principal curve, being conics of eccentricity greater than zero whose axes containing the foci of said conics lie in said vertical principal plane and intersect normally said principal curve, the curvature of said conic transverse sections at said principal curve below said great arc increasing in a continuous and regular manner at a rate substantially equal to the accelerated rate of increase in curvature of the principal curve itself, every transverse section of said variable front surface above said great arc by planes orthogonal to said principal curve being conics of eccentricity zero or greater, the lines of intersection of said orthogonal planes and said vertical principal planes all intersecting at the common center of curvature of said conics when their eccentricity is zero, the axes of said conics which contain their foci when their eccentricities are greater than zero coinciding with their respective lines of intersection of said orthogonal planes and said vertical principal plane, the eccentricities of said conic transverse section below said great arc increasing continuously and regularly with distance from said great arc, all transverse sections by planes orthogonal to the principal curve being conics of eccentricity greater than zero when said great arc is a conic of eccentricity greater than zero, the derivative of curvature of all of said conic transverse sections of eccentricities greater than zero vanishing at said principal curve, there being sufficient thickness of said lens to allow for the generating, grinding and polishing of a coacting coicoid back surface of eccentricity zero or greater or toric back surface to incorporate an ophthalmic prescription into said lens.

2. A lens as defined in claim 1, wherein said great arc is circular and the portion of the principal curve above said circular great arc is also circular and of the same radius of curvature as the circular great arc, all of said conic transverse sections by planes orthogonal to said circular portion of the principal curve being circular and of the same radius of curvature as the circular great arc, the derivative of curvature of the variable front surface vanishing in all meridian sections about all normals to said variable surface along said circular great arc, the derivative of curvature of all of said conic transverse sections of eccentricites greater than zero by planes orthogonal to the remaining portion of the principal curve vanishing at said principal curve.

3. A lens as defined in claim 1, wherein said principal curve at least below said great arc is elliptical, with its oblate point at said axial umbilical point and the minor axis of said elliptical portion of said principal curve coinciding with the axis of said variable front surface, said great arc is circular, and said lens can be osculated tangentially by a spherical surface of the same length radius of curvature as that of said circular great arc all along said circular great arc without said osculating spherical surface crossing or intersecting said variable front surface.

4. A lens as defined in claim 1, wherein said principal curve at least below said great arc is elliptical, with its oblate point at said axial umbilical point and the minor axis of said elliptical portion of said principal curve coinciding with the axis of said variable front surface, said great arc is elliptical, with its prolate point at said axial umbilical point and with the major axis of said elliptical great arc coinciding with the axis of said variable front surface, all transverse sections by planes orthogonal to the principal curve being conics of eccentricity greater than zero, and said lens can be osculated tangentially by a prolate ellipsoid of revolution whose major axis coincides with the axis of said variable surface and whose apical radius of curvature and eccentricity are the same as that of said elliptical great arc, all along said elliptical great arc, without said osculating ellipsoid of revolution crossing or intersecting said variable front surface.

5. A lens as defined in claim 1, wherein said great arc is elliptical with the major axis of said elliptical great arc coinciding with the axis of said variable surface and with the portion of the principal curve above said elliptical great arc also elliptical and having the same apical radius of curvature and eccentricity as said elliptical great arc, the major axis of said portion of the principal curve above said elliptical great arc coinciding with the axis of the variable surface, all of said conic transverse sections by planes orthogonal to said elliptical upper portion of the principal curve being elliptical arcs whose major areas coincide with the lines of intersection of said orthogonal planes and said vertical principal plane, the curvature of said conic transverse sections along said upper portion of the principal curve decreasing at an accelerated rate with increasng distance from said elliptical great arc, said accelerated rate of decrease in curvature being less than that of said upper portion of the principal curve itself, the eccentricities of said elliptical arc transverse sections also decreasing with increasing distance from said elliptical great arc, the derivative of curvature of all sections orthogonal to said elliptical great arc vanishing at said great arc, and the derivative of curvature of all conic transverse sections by planes orthogonal to the principal curve vanishing at said principal curve.

6. A lens as defined in claim 1, wherein the great arc is circular and said principal curve is elliptical with its minor axis coinciding with the axis of said variable surface, all of said transverse sections above and below said circular great arc by planes orthogonal to said principal curve being conics of eccentricites greater than zero whose axes containing their foci lie in said vertical principal plane and intersect normally said principal curve, with said variable surface symmetrical about said great arc, the derivative of curvature of the variable surface vanishing or zero in all meridian sections about all normals to said variable surface along said circular great arc, and the derivative of curvature of all of said conic transverse sections by planes orthogonal to said principal curve, above and below said circular great arc, vanishing at said principal curve.

7. A lens as defined in claim 1, wherein said great arc is circular and said principal curve is formed of one elliptical arc below said great arc and another elliptical arc above said great arc, the minor axes of both said elliptical arcs coinciding with the axis of said variable surface, all of said transverse sections of said variable surface, above said circular great arc, by planes orthogonal to said principal curve being conics of eccentricity greater than zero, whose axes containing their foci lie in said vertical principal plane and intersect normally said principal curve, the curvature of said conic transverse sections along said principal curve above said circular great arc increasing at an accelerated rate with increasing distance from said circular great arc, said accelerated rate of increase in curvature being substantially equal to the accelerated rate of increase in curvature along the principal curve itself, the eccentricites of said conic transverse sections above said circular great arc also increasing with distance from said circular great arc, the derivative of curvature of the variable surface vanishing or zero in all meridian sections about all normals to said variable surface along said circular great arc, and the derivative of curvature of all of said conic transverse sections by planes orthogonal to said principal curve, above and below said circular great arc, vanishing at said principal curve.

8. A lens as defined in claim 1, wherein said great arc is elliptical with the major axis of said elliptical great arc containing with the axis of said variable surface and said principal curve is elliptical with its major axis coinciding with the axis of said variable surface, all of said transverse sections above and below said elliptical great arc by planes orthogonal to said principal curve being conics of eccentricities greater than that of said elliptical great arc and whose major axis containing the foci of said conics lie in said vertical principal plane and intersect normally said principal curve, with said variable surface symmetrical about said great arc, the derivative of curvature of all sections by planes orthogonal to said elliptical great arc vanishing at said elliptical great arc, and the derivative of curvature of all conic transverse sections by planes orthogonal to said principal curve vanishing at said principal curve.

9. A lens as defined in claim 1, wherein said great arc is elliptical with the major axis of said great arc coinciding with the axis of the variable surface and said principal curve is formed of one elliptical arc below said elliptical great arc and another elliptical arc above said elliptical great arc, the minor axes of both said elliptical arcs comprising said principal curve coinciding with the axis of said variable surface, all of said transverse sections of said variable surface above and below said elliptical great arc by planes orthogonal to said principal curve being conics of eccentricities greater than that of said elliptical great arc and whose major axes containing the foci of said conics lie in said vertical principal plane and intersect normally said principal curve, the curvature of said conic transverse sections along said principal curve above said elliptical great arc increasing at an accelerated rate with increasing distance from said elliptical great arc, said accelerated rate of increase in curvature being substantially equal to the accelerated rate of increase in curvature along the principal curve itself, the eccentricities of said conic transverse sections above said great arc increasing the distance from said great arc, the derivative of curvature of all sections by planes orthogonal to said elliptical great arc vanishing at said great arc, and the derivative of curvature of all of said conic transverse sections by planes orthogonal to the principal curve vanishing at said principal curve.

10. A lens as defined in claim 1 of dimensions sufficient for an ophthalmic spectacle lens.

11. A lens as defined in claim 1 of a size approximately equal to or slightly smaller than the human cornea for a corneal contact lens.

* * * * *

PO-1050
(5/69)

UNITED STATES PATENT OFFICE
CERTIFICATE OF CORRECTION

Patent No. 3,950,082    Dated    April 13, 1976

Inventor(s)    David Volk

It is certified that error appears in the above-identified patent and that said Letters Patent are hereby corrected as shown below:

Colum 26, line 48, should read: "power, and a coacting conicoid back surface of".

Column 26, line 51, should read: "pair of orthogonal principal planes each of said plane of".

Column 27, line 40, should read: "coacting conicoid back surface of eccentricity zero or".

Column 29, line 29, should read: "are coinciding with the axis of said variable surface and".

Column 30, line 23, should read: "ing with distance from said great arc, the derivative of".

Signed and Sealed this twenty-ninth Day of June 1976

[SEAL]

*Attest:*

RUTH C. MASON
*Attesting Officer*

C. MARSHALL DANN
*Commissioner of Patents and Trademarks*